(12) United States Patent
Kohtani et al.

(10) Patent No.: US 7,006,239 B1
(45) Date of Patent: Feb. 28, 2006

(54) IMAGE FORMING APPARATUS WITH MANUAL INHIBITING OF PLURAL IMAGE RETENTION FORMING MODE AND CONTROL METHOD THEREFOR

(75) Inventors: Hideto Kohtani, Hachioji (JP); Takashi Nonaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/352,201

(22) Filed: Jul. 13, 1999

(30) Foreign Application Priority Data

Jul. 17, 1998 (JP) ................................. 10-203155
Feb. 2, 1999 (JP) ................................. 11-024664

(51) Int. Cl.
*G06F 15/00* (2006.01)
*G06K 15/02* (2006.01)

(52) U.S. Cl. ................. 358/1.13; 399/383; 399/204
(58) Field of Classification Search ...... 358/1.13–1.18, 358/1.1–1.9, 1.12, 296, 300, 400–403, 408, 358/437, 449–450, 474, 483, 496, 498, 500, 358/501, 505; 399/3, 4.1, 7, 16, 17, 26–28, 399/43, 66–68, 81, 82, 85, 96, 101, 116–119, 399/145, 157–179, 183, 204–215, 361–371, 399/381–398, 296–316, 154, 383, 38, 75, 399/130; 355/47, 88, 89, 97, 104–111, 114
See application file for complete search history.

(56) References Cited

U.S. PATENT DOCUMENTS

| | | | | |
|---|---|---|---|---|
| 4,748,513 A | | 5/1988 | Yamada | 358/444 |
| 5,379,098 A | * | 1/1995 | Bennett et al. | 399/301 |
| 5,383,012 A | | 1/1995 | Yamada | 399/43 |
| 5,481,365 A | * | 1/1996 | Arimoto | 358/296 |
| 5,485,257 A | * | 1/1996 | Ueda et al. | 399/66 |
| 5,572,303 A | * | 11/1996 | Arimoto | 399/303 |
| 5,673,115 A | * | 9/1997 | Arimoto | 358/296 |
| 5,745,661 A | | 4/1998 | Koh et al. | 358/1.14 |
| 5,815,280 A | | 9/1998 | Ohmura et al. | 358/296 |
| 5,926,670 A | * | 7/1999 | Furuta et al. | 399/302 |
| 5,930,571 A | * | 7/1999 | Ito | 399/302 |
| 6,034,792 A | * | 3/2000 | Nakazato et al. | 358/497 |
| 6,049,394 A | * | 4/2000 | Fukushima | 358/1.9 |

FOREIGN PATENT DOCUMENTS

| | | |
|---|---|---|
| EP | 0 735 740 | 10/1996 |
| JP | 9-258514 | 10/1997 |

* cited by examiner

*Primary Examiner*—King Y. Poon
(74) *Attorney, Agent, or Firm*—Fitzpatrick, Cella, Harper & Scinto

(57) ABSTRACT

The image formation by the plural-image formation mode is manually inhibited by the user in case the image formation is interrupted or the formed image is distorted by defective original feeding in the image formation by such plural-image formation mode. As a result, image formation of high quality can be achieved without trouble. The configuration for this purpose is featured by manually inhibiting the plural-image formation mode by depression of a touch key on an operation unit.

8 Claims, 23 Drawing Sheets

FIG. 5

| SIGNAL NAME | SHORT TITLE | DIRECTION OF SIGNAL |
|---|---|---|
| PRINTER POWER READY | /PPRDY | CONTROLLER ← PRINTER |
| CONTROLLER POWER READY | /CPRDY | CONTROLLER → PRINTER |
| READY | /RDY | CONTROLLER ← PRINTER |
| PRINT | /PRNT | CONTROLLER → PRINTER |
| TOP OF PAGE | /TOP | CONTROLLER ← PRINTER |
| LINE SYNCHRONIZATION | /LSYNC | CONTROLLER ← PRINTER |
| VIDEO CLOCK | /VCLK | CONTROLLER → PRINTER |
| IMAGE ENABLE | /VDOEN | CONTROLLER → PRINTER |
| IMAGE | /VDO | CONTROLLER → PRINTER |
| CONTROLLER CLOCK | /CCLK | CONTROLLER → PRINTER |
| COMMAND BUSY | /CBSY | CONTROLLER → PRINTER |
| COMMAND | /CMD | CONTROLLER → PRINTER |
| STATUS BUSY | /SBSY | CONTROLLER ← PRINTER |
| STATUS | /STS | CONTROLLER ← PRINTER |
| PRINTER POWER READY | /PFED | CONTROLLER → PRINTER |
| SPEED CHANGE | /SPCHG | CONTROLLER → PRINTER |
| PAPER DELIVERY | /PDLV | CONTROLLER ← PRINTER |
| TOP OF PAPER | /TOPR | CONTROLLER ← PRINTER |
| STATUS CHANGE INFORMATION | /CCRT | CONTROLLER ← PRINTER |

IMAGE FORMING APPARATUS WITH MANUAL INHIBITING OF PLURAL IMAGE RETENTION FORMING MODE AND CONTROL METHOD THEREFOR

BACKGROUND OF THE INVENTION

1. Field of the Invention

The present invention relates to an image forming apparatus and a control method therefor.

2. Related Background Art

In the conventional color copying apparatus equipped with a transfer drum or an intermediate transfer member, only one image is formed on such transfer drum or intermediate transfer member in case of output of a large-sized sheet such as of A3 size, but, in case of a half-sized (A4 size) sheet, there is executed a two image formation mode (two image retention mode) for forming two images in succession on the transfer drum or on the intermediate transfer member in order to increase the throughput. In the half size image formation, such mode allows to achieve a doubled productivity.

In such image forming apparatus, the two image formation mode can usually be executed only in case of forming plural outputs from a same original in the color image formation. However, in the monochromatic output with the above-described image forming apparatus, since the transfer process is completed by one step for black color, the throughput of monochromatic image formation can be improved by scanning two originals in succession, instead of an original, and forming two images of such two originals on the transfer drum or the intermediate transfer member.

Most of the conventional color copying apparatus similar in configuration to the above-described image forming apparatus utilizes the two image formation mode in the monochromatic image formation, in order to increase the productivity.

FIGS. 26, 27 are block diagrams showing the connection of a reader unit in the conventional image forming apparatus.

In these drawings, there are shown an image reading device (reader unit) 2501 for reading an original; a host computer 2104; a printer controller 2103 for controlling the entire printer; a video I/F 2101 for executing communication between a printer engine 2102 and the printer controller 2103; a printer engine 2102 for recording transmitted image data on a recording sheet; a network 2105; a controller 2602 for transmitting print data, transmitted from the host computer 2104, to the printer engine 2102, also controlling the entire printer and executing communication with the reader unit 2501 through an I/F 2601; and a selector unit 2603 for selectively controlling the transmission of the image data from the controller 2602 or the reader unit 2501 to the printer engine 2102.

In the conventional image forming apparatus described above, the timing of image formation is determined by the function timing of the image receiving member such as the transfer drum or the intermediate transfer member, so that the replacement of the original by an original feeding device equipped in the reader unit has to be completed within a predetermined replacement time. In case the replacement of the original cannot be completed within the predetermined replacement time, the image formation is started before the replacement of the original (transportation of the original on the original table) is completed, so that proper image formation cannot be achieved.

However, the speed of original replacement is significantly affected by the paper quality of the original or the state thereof, and the time required for the original replacement may become significantly longer than the normal replacement time, depending on the quality or state of the original. If the replacement time exceeds that required for the two image formation mode, there may result a situation where the output image for the replaced original becomes distorted or the image output cannot be achieved even after retry because the situation is misjudged as an original jam state.

SUMMARY OF THE INVENTION

In consideration of the foregoing, an object of the present invention is to provide an image forming apparatus capable of achieving high-quality image formation without trouble, and a control method therefor.

The above-mentioned object can be attained, according to an embodiment of the present invention, by an image forming apparatus provided with a reader unit (101 in FIG. 1) for reading image information from the original fed in succession by an original feeding device (801 in FIG. 10) and capable of forming images by a plural image formation mode in which an image forming unit (2003 in FIG. 1) forms images, based on the image information of originals of a predetermined number read in succession by the reader unit, forms on an image bearing member (intermediate transfer member 405 in FIG. 6) and transferring the images on the image bearing member respectively onto recording media of a predetermined number fed in succession, wherein the apparatus comprises instruction means (operation unit 905 in FIG. 11) for manually inhibiting the execution of the plural image formation mode.

Another object of the present invention is to provide an image forming apparatus having novel functions and a control method therefor.

Still other objects of the present invention, and the features thereof, will become fully apparent from the following description of the embodiments, which is to be taken in conjunction with the attached drawings.

BRIEF DESCRIPTION OF THE DRAWINGS

FIG. 5 is a list of signals exchanged through the video I/F shown in FIGS. 3A and 3B;

DESCRIPTION OF THE PREFERRED EMBODIMENTS

First Embodiment

At first there will be explained the entire configuration of an image forming apparatus constituting a first embodiment with reference to FIG. 1, which is a schematic block diagram showing the configuration of the image forming apparatus.

Figure 1:
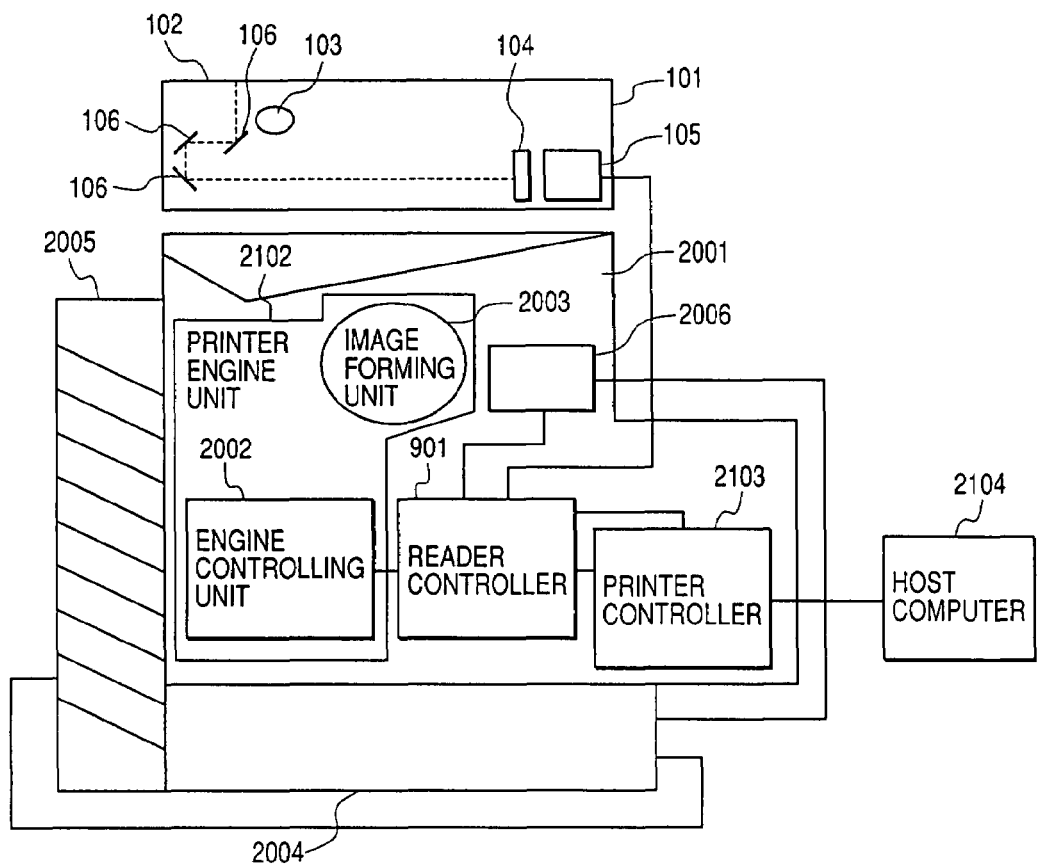
FIG. 1 is a schematic block diagram showing the configuration of an image forming apparatus constituting an embodiment of the present invention.

Referring to FIG. 1, a reader unit 101 serves to read the image of an original placed on an original table 102, and is provided with an original table 102, a light source 103, photoelectric conversion means 104, analog-digital conversion means 105, scanning mirrors 106 etc. The light source 103 and the scanning mirrors 106 irradiate and scan the original placed on the original table 102. The photoelectric conversion means 104 executes photoelectric conversion on the light reflected from the original and outputs an analog image signal. The analog-digital conversion means 105 converts the analog image signal, outputted from the photoelectric conversion means 104, into a digital signal.

Figure 2:
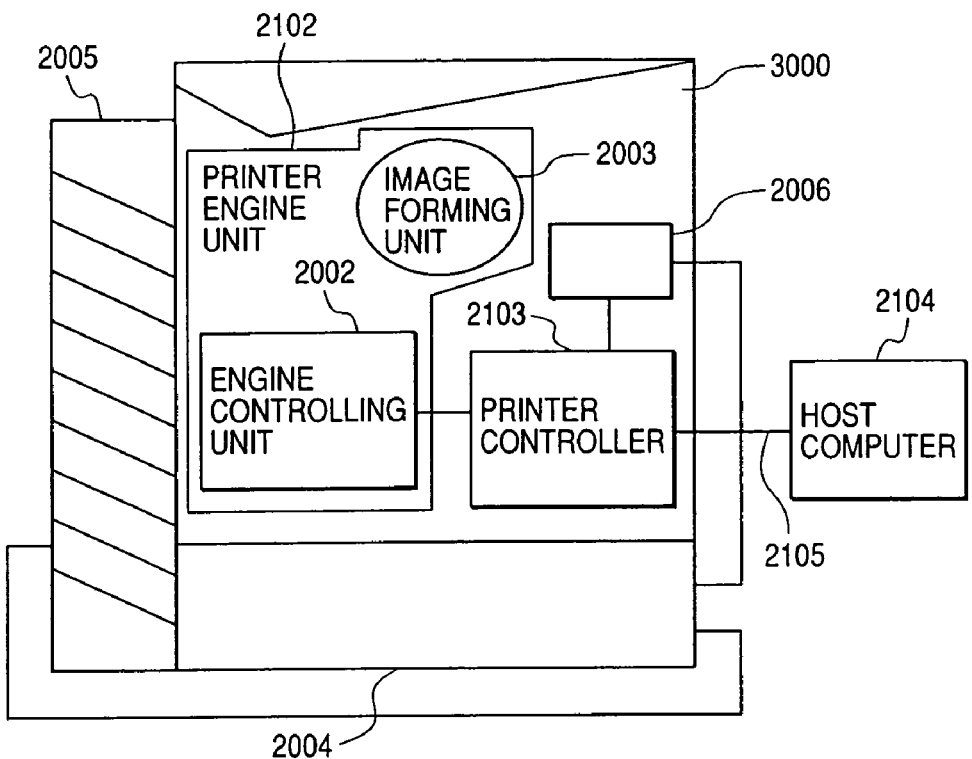
FIGS. 2, 3A and 3B are schematic block diagrams showing the configuration of a printer provided with a printer controller and a printer engine.
Figure 3A:
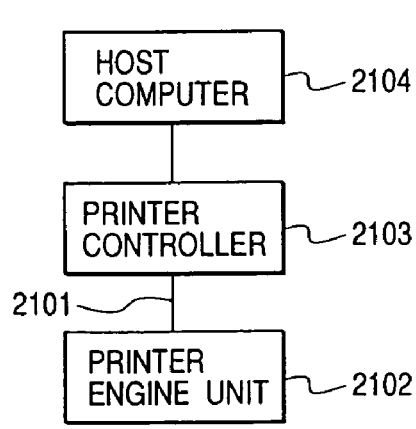
Figure 3B:
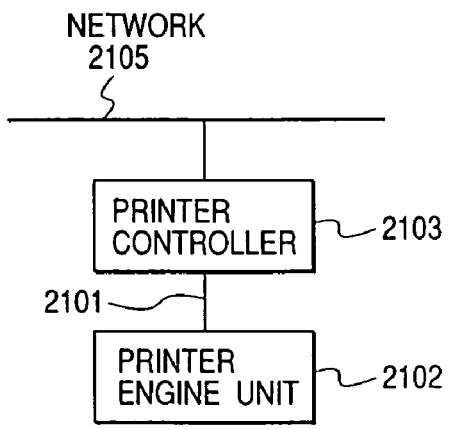

There are also provided a reader controller 901 for controlling the reader unit 101; a printer unit 2001; an engine control unit (DC controller) 2002 for controlling sheet transfer and image formation in an image forming unit (engine) 2003 shown in FIG. 6 as will be explained later; a printer engine 2102 composed of an engine control unit 2002, an image forming unit 2003 etc.; and a printer controller 2103 incorporated in and collectively controlling the printer unit 2001 as shown in FIGS. 2, 3A and 3B.

There are further provided a host computer 2104 connected in 1-to-1 relationship to the printer controller 2103 or connected thereto through a network 2105 shown in FIGS. 3A and 3B; a sheet feeding cassette deck 2004 containing the recording sheets and rendered optionally expandable; a sorter 2005 containing sheet discharge bins for receiving the recording sheets after image formation, having a stapling function and a sheet offset discharge function and rendered optically expandable; and an option controller 2006 for controlling the options which are the sheet feeding cassette deck 2004 and the sorter 2005.

The reader controller 901 is provided with means for processing the digital image signal outputted from the analog-digital conversion means 105 and means for controlling an unrepresented motor for driving the light source 103, the scanning mirrors 106 etc. for the original reading, and has a function of controlling the communication with the engine control unit 2002 and the printer controller 2103.

In the present embodiment, the reader controller 901 is incorporated in the printer unit 2001 so that the cables for communication with the engine control unit 2002 or the printer controller 2103 are not exposed externally.

[Configuration of Printer Controller and Printer Engine Unit]

In the present embodiment, the printer controller 2103 and the printer engine 2102 are connected through the reader controller 901 and execute the process therebetween. Prior to the description of the image forming apparatus of the present embodiment, there will at first be explained, with reference to FIGS. 2, 3A, 3B and 4 to 9, the configuration of the printer including the printer controller 2103 and the printer engine unit 2102 (including the engine control unit 2002).

FIGS. 2, 3A and 3B are schematic block diagrams showing the configuration of the printer including the printer controller 2103 and the printer engine unit 2102 (including the engine control unit 2002), wherein components same as those in FIG. 1 are represented by same numbers.

In FIG. 2, there are shown a printer main body 3000; an engine control unit 2002 for controlling the sheet transportation and the image formation in the printer; an image forming unit 2003; a printer controller 2103 incorporated in the printer main body 3000; and a host computer 2104 connected to the printer controller 2103 either in a 1-to-1 relationship or through a network 2105.

There are also provided a sheet feeding cassette deck 2004 which is optionally expandable; a sorter 2005 which is optionally expandable; and an option controller 2006 for controlling the sheet feeding cassette deck 2004 and the sorter 2005.

Referring to FIGS. 3A and 3B, a video I/F 2101 executes communication between the printer engine unit 2102 and the printer controller 2103. The signals exchanged through the video I/F 2101 will be explained later. The printer engine unit 2102 forms the electrical image signal, received through the video I/F 2101, in a visible form, transferring and fixing it on the recording sheet, and controls various loads for realizing such image forming sequence. It also detects the state of the printer engine unit 2102 and informs the printer controller 2103 of such state.

FIG. 3A shows a state in which the printer controller 2103 and the host computer 2104 are connected in a 1-to-1 relationship, while FIG. 3B shows a state in the printer controller 2103 is connected to an unrepresented computer through the network 2105.

The printer controller (PDL controller) 2103 receives the data transmitted from the host computer 2104 or through the network 2105, in various formats such as bit map data or PDL (page description language) format. It develops such data in an unrepresented memory in data of a raster format and transfers such developed data to the printer engine unit 2102. Thus the data prepared in the host computer 2104 can be printed in the printer.

In the following there will be explained, with reference to FIGS. 4 and 5, the signals communicated through the video I/F 2101 connecting the printer controller 2103 and the printer engine unit 2102 shown in FIG. 2.

Figure 4:
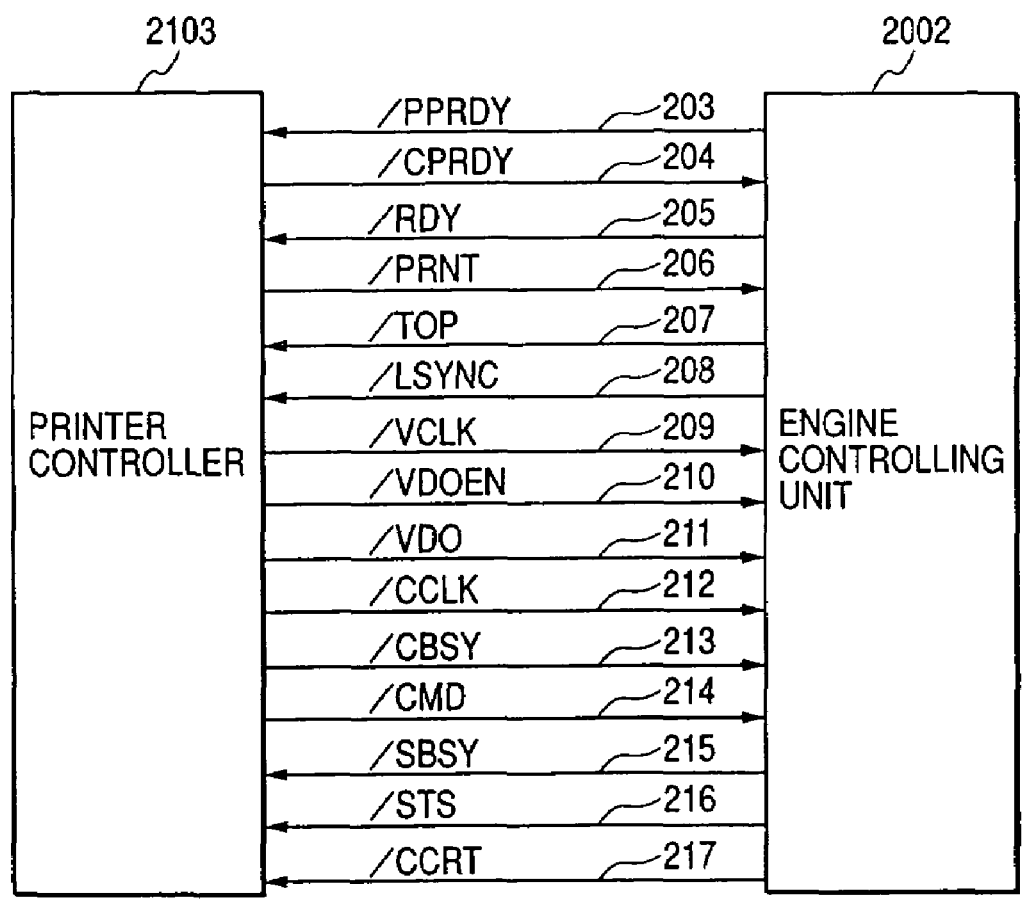
FIG. 4 is a view showing principal signals exchanged between the printer controller and the printer engine shown in FIG. 2 through a video I/F.

FIG. 4 shows the principal signals exchanged between the printer controller 2103 and the printer engine unit 2102, shown in FIG. 2, through the video I/F 2101, wherein components same as those in FIG. 2 are represented by same numbers.

In FIG. 4, there are shown the printer controller 2103 and an engine control unit 2002 for controlling the engine (image forming unit 2003) in the printer engine unit 2102 shown in FIGS. 3A and 3B.

The printer controller 2103 and the engine control unit 2002 exchange signals as shown in FIG. 4.

In FIG. 4, there are shown a /PPRDY signal 203; a /CPRDY signal 204; a /RDY signal 205; a /PRNT signal 206; a /TOP signal 207; a /LSYNC signal 208; a /VCLK siganl 209; a /VDOEN signal 210; a /VDO signal 211; a /CCLK signal 212; a /CBSY signal 213; a /CMD signal 214; a /SBSY signal 215; a /STS signal 216; and a /CCRT signal 217.

The /PPRDY signal 203, /RDY signal 205, /TOP signal 207, /LSYNC signal 208, /SBSY siganl 215, a /STS signal 216 and /CCRT signal 217 are transmitted from the engine control unit 2002 to the printer controller 2103, while the /CPRDY signal 204, /PRNT signal 206, /VCLK signal 209, /VDOEN siganl 210, /VDO signal 211, /CCLK signal 212, /CBSY signal 213 and /CMD signal 214 are transmitted from the printer controller 2103 to the engine control unit 2002. The details of these signals 203 to 217 will be omitted.

FIG. 5 is a list of the signals exchanged through the video I/F 2101 shown in FIGS. 3A and 3B. In the following there will be explained the principal signals shown in FIG. 4.

The /PPRDY signal 203 indicates, after the printer engine unit 2102 has been powered and has completed initialization, that it is enabled for communication with the printer controller 2103.

The /CPRDY signal 204 indicates, after the printer controller 2103 has been powered and has completed initialization, that the engine control unit 2002 is enabled for communication.

The /RDY signal 205 indicates that the engine control unit 2002 is enabled for the printing operation, in response to a print start command (/PRNT signal 206) from the printer controller 2103. This signal becomes true only in case the various units of the printer function in proper conditions, such as (1) the interior of the fixing unit has reached the predetermined temperature, (2) the recording sheet does not remain in the printer, (3) the polygon mirror rotates at a predetermined speed etc.

The /PRNT signal 206 instructs the start or continuation of the printing operation from the printer controller 2103 to the engine control unit 2002.

The /TOP signal 207 is a synchronization signal transferred from the engine control unit 2002 to the printer controller 2103 as the reference for vertical image scanning. This signal is outputted after a predetermined time from the output of the /PRNT signal 206 by the printer controller 2103.

The /LSYNC signal 208 is a synchronization signal used by the printer controller 2103 as the reference for horizontal scanning and is outputted, like the /TOP signal 207, after a predetermined time from the output of the /PRNT signal 206 by the printer controller 2103.

The /VCLK signal 209 is a synchronization clock signal for the /VDOEN signal 210 and the /VDO signal 211 to be explained later and has a frequency corresponding to that of the image signal from the printer controller 2103.

The /VDOEN signal 210 controls the fetching of the image signal, outputted from the printer controller 2103, into the engine control unit 2002. The engine control unit 2002 detects whether this signal is true or false in synchronization with the /VCLK signal 209, and fetches or not the image signal respectively if this signal is true or false.

The /VDO signal 211 is the image data. The printer controller 2103 outputs this signal in synchronization with the /VCLK signal 209, taking the /TOP signal 207 and the /LSYNC signal 208 as reference respectively in the vertical and horizontal directions.

The /CCLK signal 212 is a synchronization clock signal, outputted from the printer controller 2103, at the transmission of a serial command from the printer controller 2103 to the engine control unit 2002 and at the response of a serial status signal from the engine control unit 2002 to the printer controller 2103.

The /CBSY signal 213 indicates, to the engine control unit 2002, that the printer controller 2103 is transmitting the serial command by the /CMD signal 214 to be explained later.

The /CMD signal 214 is used when the printer controller 2103 transmits serial information to the engine control unit 2002, and such serial information is called a command.

The /SBSY signal 215 indicates, to the printer controller 2103, that the engine control unit 2002 is returning the serial status by the /STS signal 216.

The /STS signal 216 is used when the engine control unit 2002 returns serial information to the printer controller 2103, and such serial information is called a status.

The /CCRT signal 217 is used for reporting a change in the status of the printer to the printer controller 2103. In response, the printer controller 2103 issues, by the /CMD signal 214, a command inquiring the changed state of the engine, and the engine control unit 2002 informs the inquired state by the /STS signal 216.

Figure 6:
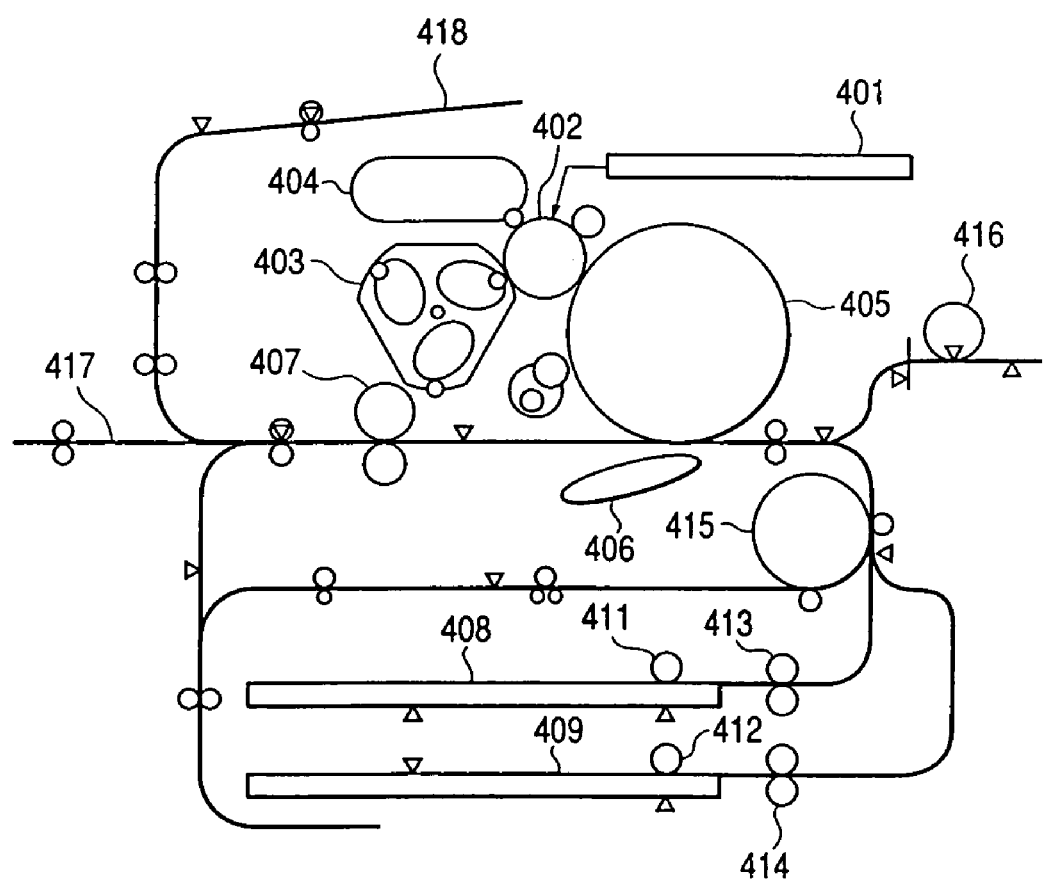
FIG. 6 is a cross-sectional view of an image forming unit controlled by an engine control unit shown in FIG. 2.

FIG. 6 is a cross-sectional view showing the configuration of the image forming unit 2003 controlled by the engine control unit 2002 shown in FIG. 2.

Referring to FIG. 6, a scanner 401 converts the /VDO signal 211, which is the image signal from the printer controller 2103, into a laser beam for irradiating a photosensitive member 402, thereby forming an image thereon. The photosensitive member 402 rotates counterclockwise to reach a color developing unit 403 or a black developing unit 404, which deposits toner onto the photosensitive member 402 according to the charge formed thereon, thus developing the image.

The black developing unit 404 alone is activated in case of a monochromatic (black-and-white) image, while both the black developing unit 404 and the color developing unit 403 are activated in case of a color image. The image formed on the photosensitive member 403 is then transferred onto a clockwise rotating intermediate transfer member 405, which completes image formation by a single turn in case of the monochromatic image or four turns in case of the color image.

On the other hand, a recording sheet fed from an upper cassette 408 or a lower cassette 409 by a pick-up roller 411 or 412 is transported by feed rollers 413 or 414, and is further transported by a transport roller 415 to a position in front of registration rollers.

The transportation of the recording sheet is so controlled that it arrives at a position between the intermediate transfer member 405 and a transfer belt 406 at the timing of completion of image formation on the intermediate transfer member 405. The transfer belt 406 is brought into contact with the intermediate transfer member 405 at the arrival of the recording sheet, whereby the toner is transferred thereon. The image transferred onto the recording sheet is fixed thereto by heat and pressure applied by fixing rollers 407.

The recording sheet bearing the fixed image is transported to a face-up exit 417 or a face-down exit 418, designated in advance by the printer controller 2103, and is thus discharged. The image information transmitted from the printer controller 2103 can thus be outputted through the above-described steps.

In the following there will be explained, with reference to FIG. 7, the signal exchanges in time through the video I/F 2102 shown in FIGS. 3A and 3B.

Figure 7:
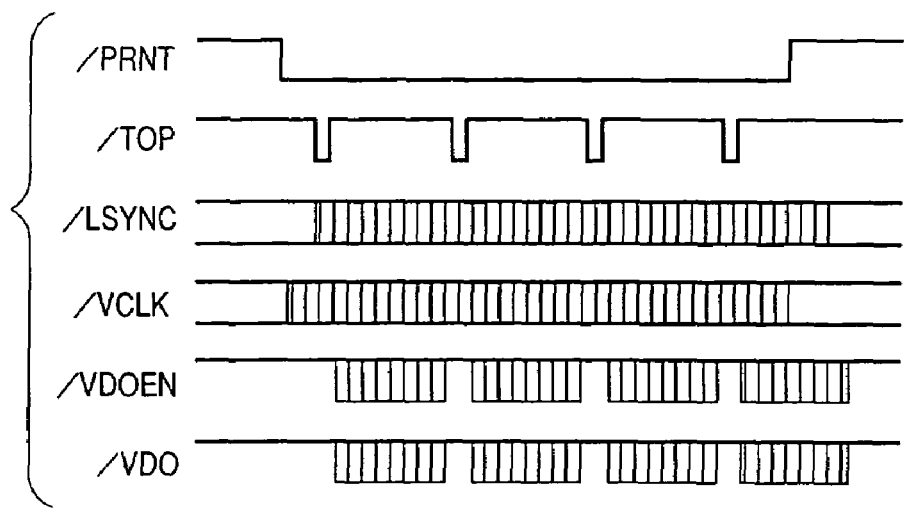
FIG. 7 is a timing chart showing the timing of signals exchanged through the video I/F shown in FIGS. 3A and 3B.

FIG. 7 is a timing chart showing the timing of signals exchanged through the video I/F 2102 shown in FIGS. 3A and 3B.

At first, when the image information becomes ready in the printer controller 2103, such state is transmitted to the engine control unit 2002 by the /PRNT signal 206 in the low-level (true) state. At the same time, there is generated by the /VCLK signal 209 which is the image sync signal used for the transfer of the image signal.

In response to the engine control unit 2002 executes various settings in the printer engine unit 2102, and, when it becomes ready for receiving the image information, the /TOP signal 207 and the /LSYNC signal 208 are outputted to the printer controller 2103. In synchronization with the /TOP signal 207 which is the vertical sync signal and the /LSYNC signal which is the horizontal sync signal, the printer controller 2103 transfers the /VDO signal (image signal) 211 and the /VDOEN signal (image enable signal) 210 to the engine control unit 2002.

In the following there will be explained, with reference to FIG. 8, the mode of exchange of command and status by the serial communication in the course of function of the printer.

Figure 8:
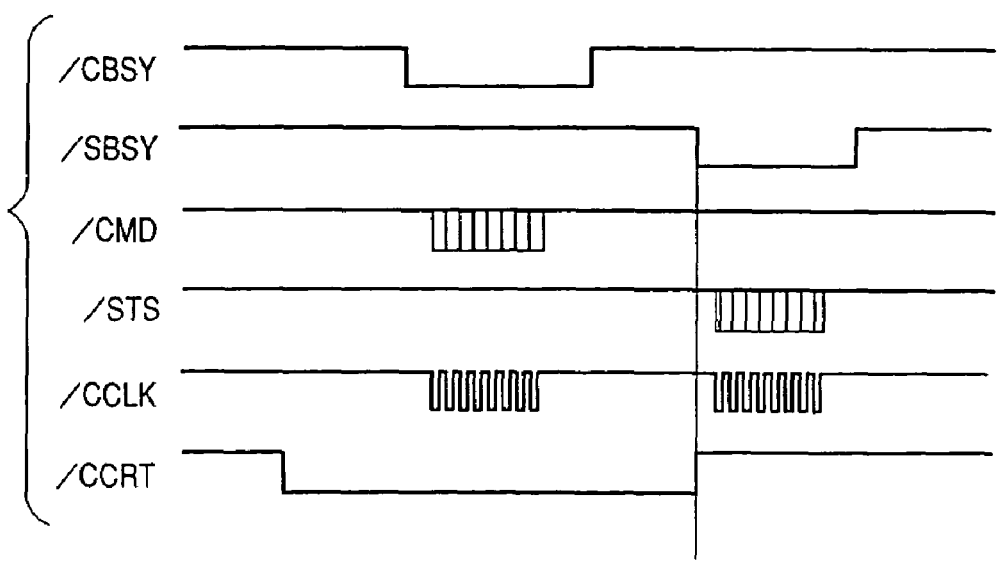
FIG. 8 is a timing chart showing the timing of signals exchanged between the printer controller and the engine control unit shown in FIG. 2.

FIG. 8 is a timing chart showing the timing of the signals exchanged between the printer controller 2103 and the engine control unit 2002 shown in FIG. 2.

At first there will be explained a case in which the /CCRT signal 217, shown in the lowermost part of FIG. 8.

In case the printer controller 2103 wishes to issue a command to the engine control unit 2002, the /CBSY signal 213 is shifted to the low-level (true) state, and the command data are transmitted by the /CMD signal 214 in synchronization with the /CCLK signal 212.

In response, the engine control unit 2002 at first confirms that the /CBSY signal 213 is in the high-level (false) state, then shifts the /SBSY signal 215 to the low-level (true) state and sends, by the /STS signal 216, the status data corresponding to the command, in synchronization with the /CCLK signal 212 generated by the printer controller 2103. The printer controller 2103 receives such status data and accordingly continues or interrupts the printer control.

In the following there will be explained the /CCRT signal 217. This signal assumes the low-level (true) state in case a state of the engine, designated in advance by the printer controller 2103, shows a change. There will be explained a case, as an example, that the printer controller 2103 in advance so sets, by the /CMD signal 214, that the /CCRT signal 217 assumes the true state when the recording sheet is absent.

If the printer controller 2103 issues a printout request for two prints when there is only one remaining recording sheet, the print sequence is properly executed for the first print. However, as the recording sheet for the second print is absent, the printer engine detects the change of the state at the start of the image formation for the second print, and shifts the /CCRT signal 217 from the high-level state to the low-level state for transmission to the printer controller 2103.

In response, the printer controller 2103 issues a command requesting the status indicating the presence or absence of the recording sheet in the sheet feeding unit. In response the engine control unit 2002 returns a status indicating the cassette without the recording sheet to the printer controller 2103. The /CCRT signal 217 is cleared to the high-level state when the /SBSY signal 215, indicating the returned status, is shifted to the low-level state.

In the following there will be explained, with reference to FIG. 9, the exchange of the command and status and the printing operation, by the printer controller 2103 and the engine control unit 2002.

Figure 9:
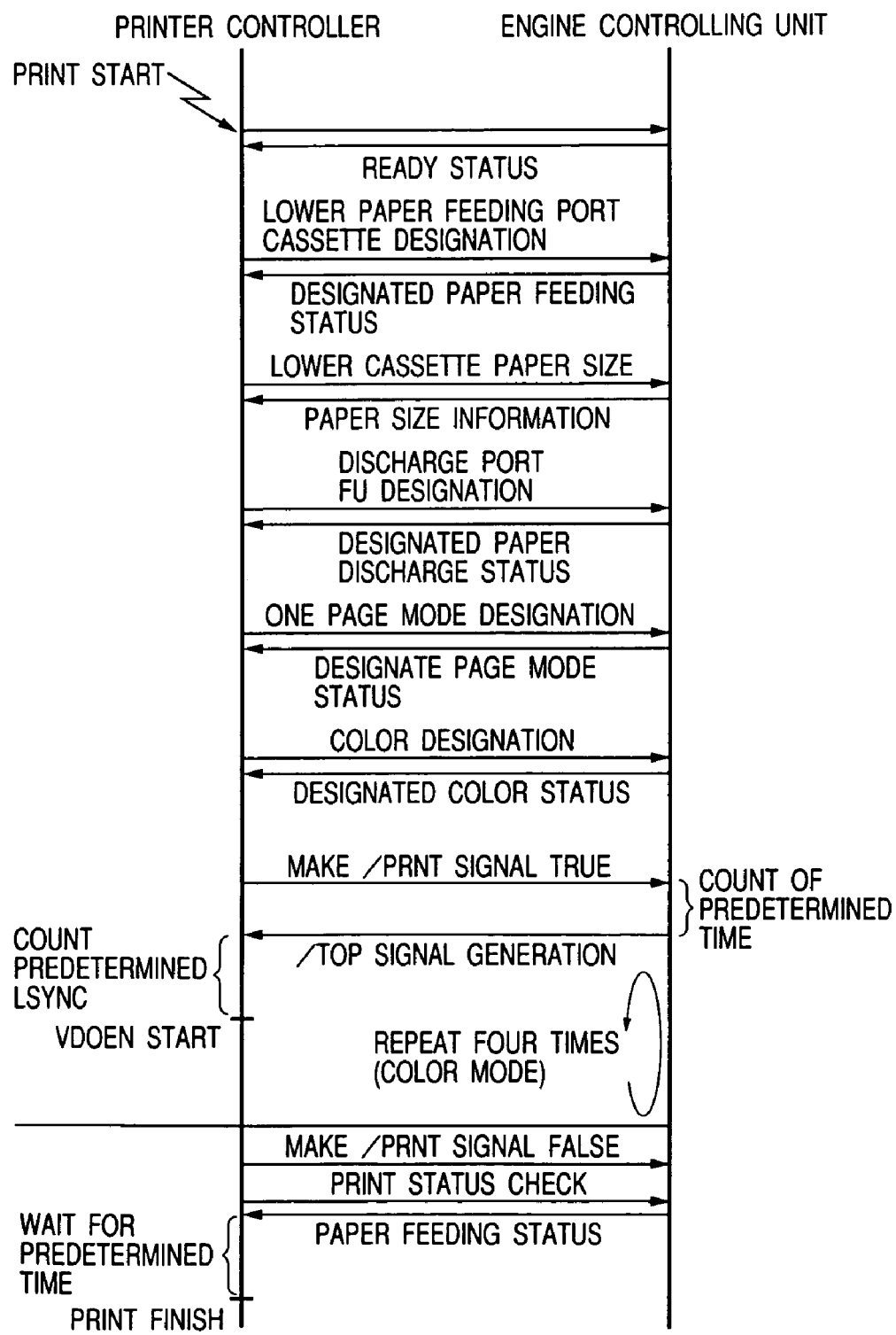
FIG. 9 is a chart showing the exchange of command and status signals between the printer controller and the engine control unit shown in FIG. 2 for the printing operation.

FIG. 9 is a chart showing the exchange of command and status and the printing operation by the printer controller 2103 and the engine control unit 2002 shown in FIG. 2, particularly in a color image printing operation.

At first, when a print start request is generated, the printer controller 2103 checks the ready state of the printer while executing image data conversion etc. Then it issues a command designating the feeding cassette of the recording sheet. It also issues a command requesting the sheet size in the designated cassette, and the engine control unit 2002 returns statuses corresponding to these commands.

Then a command for designating the sheet discharge exit is issued to determine the sheet discharge exit, and a page mode designation command is issued to designate the number of pages to be printed. Finally a command designating the monochromatic or color image formation is issued to complete the settings in the printer.

Subsequently the printer controller 2103 sends the /PRNT signal 206 for requesting the printing operation to the engine control unit 2002. In response, after counting a predetermined time, the engine control unit 2002 returns the /TOP signal 207. The image is transferred by the /VDO signal 211 to the engine control unit 2002 in synchronization with the /VCLK signal 209, also in synchronization with the /TOP signal 207 and the /LSYNC signal 208 respectively in the vertical and horizontal directions. As the color mode is selected in the contemplated case, the /TOP signal 207 is generated four times to form images of CMYK four colors.

After the generation of the last /TOP signal 207, the /PRNT signal 206 is returned to the high-level (false) state, whereby the engine control unit 2002 detects the end of the print request and enters a post process such as the cleaning of the intermediate transfer member 405 shown in FIG. 6. The recording sheet bearing the transferred images passes the fixing rollers 407 shown in FIG. 6 and is discharged to the designated discharge exit.

The printing operation is completed when the printer controller 2103 confirms, from the engine control unit 2002, that the recording sheet is no longer transported and has been discharged, and the printer controller 2103 waits in the ready state until a next print request is generated.

In case an illegal state such as jamming of a recording sheet, absence of the recording sheet or a door opening by the user is generated in the course of the above-described operations, the abnormality in the printer engine unit 2102 is immediately transmitted by the /CCRT signal 217 from the engine control unit 2002 to the printer controller 2103, which in response executes a corresponding operation.

The printer controller 2103 and the printer engine unit 2102 (engine control unit 2002) executes process as explained in the foregoing.

[Configuration with Reader Controller]

In the following there will be explained a configuration having the reader controller 901 between the printer controller 2103 and the engine control unit 2002, namely the configuration of the image forming apparatus of the present embodiment.

Figure 10:
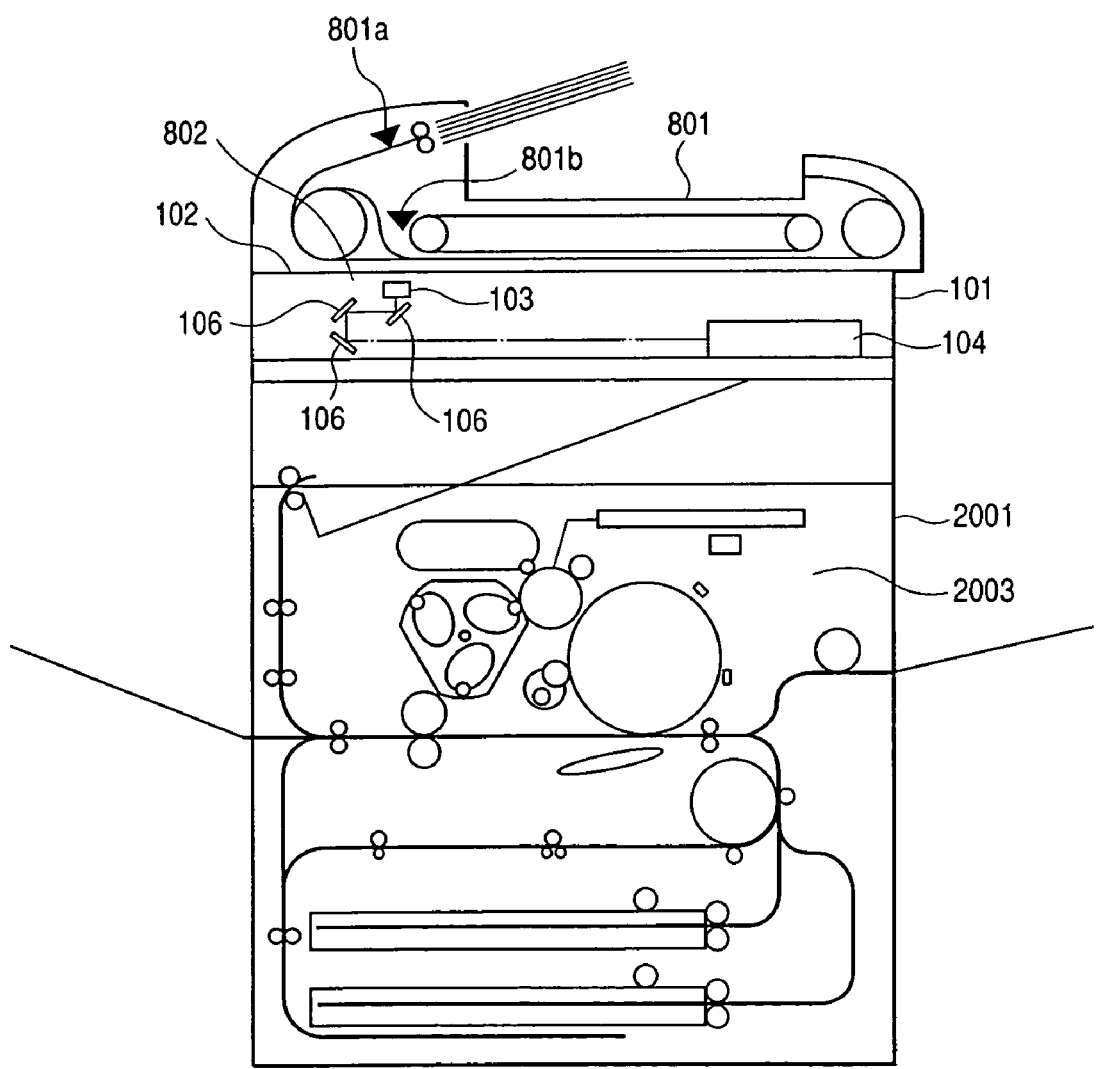
FIG. 10 is a schematic cross-sectional view of the image forming apparatus shown in FIG. 1.

FIG. 10 is a schematic cross-sectional view showing the configuration of the image forming apparatus shown in FIG. 1, in which an image reader unit and a reader controller are attached to the printer main body 2001 shown in FIG. 2. The reader controller serves to optical read the image of the original and to convert the image into a digital signal for output. In FIG. 10, which is an elevation view of the image forming apparatus of the present embodiment, component same as those in FIG. 1 are represented by same numbers.

In FIG. 10 there are shown an original feeding device 801 for feeding the original to an optically reading position (original table 102); a sensor 801a for detecting the size of the transported original; a sensor 801b for detecting whether the replacement of the original has been completed; and a scanning unit 802 (optical reading unit) composed of a light source 103, scanning mirrors 106 etc. The original feeding device 801 is driven in synchronization with the reader unit 101, and, when an original is transported onto the original table 102 by the original feeding device 801, the light source 103 and the scanning mirrors 10 (scanning unit 802) of the reader unit 101 scan the image of the original while moving to the right, thus sending the reflected light with suitable optical processing to the photoelectric conversion unit 104. The image forming unit 2003 is constructed same as shown in FIG. 6.

Figure 11:
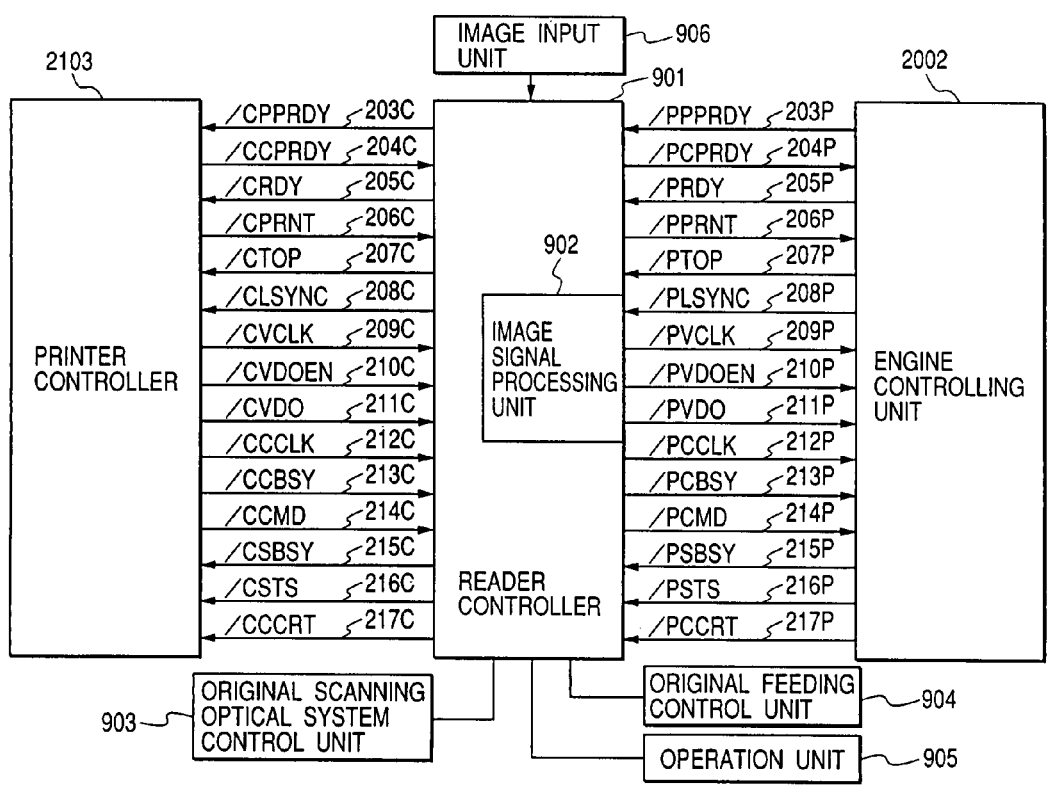
FIG. 11 is a block diagram showing the connection of the printer controller, the engine control unit and the reader controller shown in FIG. 1.

FIG. 11 is a block diagram showing the connection of the printer controller 2103, the engine control unit 2002 and the reader controller 901 shown in FIG. 1. FIG. 11 shows the electrical connection in case the reader controller 901 is attached to the configuration shown in FIG. 4, and best represents the concept of the present embodiment. In FIG. 11, components same as those in FIG. 1 are represented by same numbers.

Referring to FIG. 11, the reader controller 901 is positioned between the printer controller 2103 and the engine control unit 2002 shown in FIG. 4. Signal lines between the printer controller 2103 and the reader controller 901 and those between the engine 2002 and the reader controller 901 are same in function as those shown in FIG. 4. However, the signals between the printer controller 2103 and the reader controller 901 and those between the engine 2002 and the reader controller 901 are physically different, so that the former ones are represented with a suffix C while the latter ones are represented with a suffix P.

There are also shown an image signal processing unit 902; an original scanning optical system control unit 903 for controlling the reader unit 101; an original feeding control unit 904 for controlling the original feeding device 801; an operation unit 905 accepting various inputs for setting; and an image input unit 906 for entering the image signal, converted in the photoelectric conversion unit 104, into the reader controller 901, in which the image signal is transferred to the image signal processing unit 902 therein.

Figure 12:
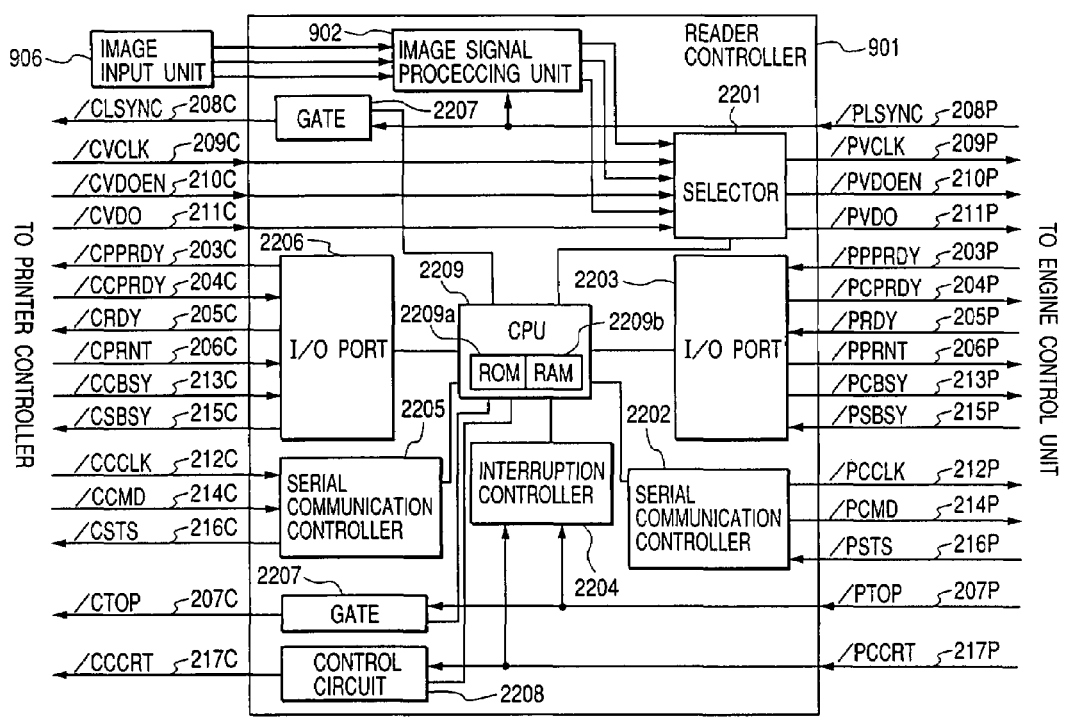
FIG. 12 is a block diagram showing the control configuration of the reader controller shown in FIG. 11.

FIG. 12 is a block diagram showing the control configuration of the reader controller 901 shown in FIG. 11, wherein components same as those in FIG. 12 are represented by same numbers.

In FIG. 12, there are shown the reader controller 901 shown in FIG. 11; the image signal processing unit 902 shown in FIG. 11; the image input unit 906 shown in FIG. 11; and a selector 2201 for selecting the output of the image signal processing unit 902 or the signal transmitted from the printer controller 2103 for supply to the engine control unit 2002. The selector 2201 switches the /VCLK image clock signal, the /VDOEN image enable signal and the /VDO image data signal.

There are further shown a serial communication controller 2202 for executing communication with the engine control unit 2002; an I/O port 2203 for exchanging signals for complementing the communication by the serial communication controller 2202; an interruption controller 2204 receiving an image front end request signal /PTOP 270P and a printer state change signal /PCCRT 217P; and a serial communication controller 2205 for effecting communication with the printer controller 2103.

There are also provided an I/O port 2206 for exchanging signals for complementing the communication by the serial communication controller 2205; and a gate 2207 for controlling whether or not to transmit the signal from the printer engine unit 2102 to the printer controller 2103. The gate 2207 controls the image top request signal /TOP and the line sync signal /LSYNC.

A control circuit 2208 has gating function and flag setting function, and controls the printer state change signal /CCRT. The gating function controls whether or not to transmit the printer state signal /PCCRT 217P issued by the engine control unit 2002 to the printer controller 2103, and the flag setting allows the reader controller 901 to issue the printer state change signal /CCRT to the printer controller 2103.

A CPU 2209 controls the entire reader controller 901 based on a control program stored in a ROM 2209a. A RAM 2209b is used as a work area of the CPU 2209.

[Operation Unit]

The input from the operation unit 905 becomes effective in case the reader controller 901 is mounted on the printer unit 2001 as described above. In the following there will be given an explanation on the operation unit 905 shown in FIG. 11.

Figure 13:
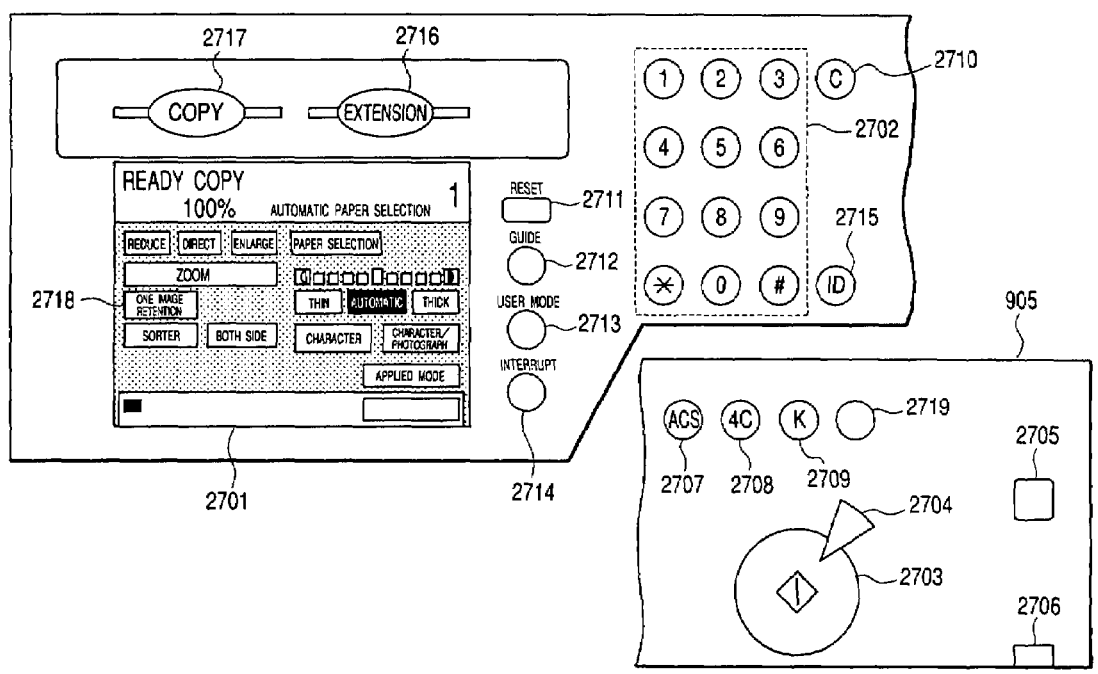
FIG. 13 is a plan view showing the details of an operation unit shown in FIG. 11.

FIG. 13 is a plan view showing the details of the operation unit 905 shown in FIG. 11.

A display area 2701 displays the set content and the status of the apparatus. It is composed of a touch panel to enable various settings by the depression of touch keys provided therein. Numeral keys 2702 are used for entering various numbers required for example in the copying operation. A copy start key 2703 is depressed in starting the copying operation.

There are also provided a stop key 2704 for interrupting the current copying operation etc; a power supply key 2705; a lamp 2706 indicating that the power supply is currently turned on; an auto color selection mode key 2707 for selecting an auto color selection mode; a full color mode key 2708 for selecting a full color mode; a black-and-white mode key 2709 for selecting a black-and-white mode; a mono color selection key 2719 for selecting a mono color copy mode with one of yellow (Y), magenta (M) and cyan (C) colors.

There are further provided a clear key 2710 for clearing the number entered by the numeral keys 2702; a reset key 2711 for resetting the mode; a guide-key 2712; a user mode key 2713 for detailed setting; an interruption key 2714; an ID key 2715 for restoring an ID input image frame; an extension key 2716 for setting on the printer functions; a copy mode key 2717 for restoring the copy mode; and a touch key 2718 for setting a one-image formation (retention) mode (two-image formation (retention) inhibiting mode to be explained later). When the one-image formation mode is set, it can be cleared by depressing the touch key 2718 again.

[Operations in Copying]

In the following there will be explained, with reference to FIGS. 11, 12 and 13, operation of the above-described image forming apparatus in case of reading the image of a full-color original by the reader unit 101 and outputting the image by the image forming unit 2003.

In response to the depression of the copy start key 2703 of the operation unit 905 shown in FIG. 13, the reader controller 901 shown in FIG. 12 closes, for the copying mode, the gate 2207 and the signal control circuit 2208 and so sets the selector 2201 as to select the output of the image processing unit 902. Then it checks, utilizing the I/O port 2203, the printer ready state signal /PRDY 205P from the engine control unit 2002.

Then the serial communication controller 2202 is used for executing various settings on the engine control unit 2002. At first issued is a command for designating the feeding cassette of the recording sheet. Then issued is a command for requesting the size of the recording sheet in the designated cassette. In response to these commands, the engine control unit 2002 returns corresponding statuses. Then a command is issued to determine the sheet discharge exit, and a page mode designation command is issued to designate the number of pages to be formed. Finally a command for designating monochromatic/color mode is issued, whereby all the settings in the printer engine 2101 are completed.

Then, after an original is fed onto the original table 102 by the original feeding device 801, the reader controller 901 sends the print request signal /PPRNT 206P to the engine control unit 2202. In response, after a predetermined time, the engine control unit 2002 returns the /PTOP signal 207P. This signal is processed in the interruption controller 2204 whereby the reader unit 101 is operated in synchronization with the /PTOP signal 207P.

The /PVDO signal 211P, entered from the photoelectric conversion unit 104 to the image signal processing unit 902 through the image input unit 906, is transferred to the engine control unit 2002 in synchronization with the /PVCLK signal 209P and also in synchronization with the /PTOP signal 207P in the vertical scanning direction and with the /PLSYNC signal 208P in the horizontal direction.

As the color mode is selected in the contemplated case, the scanning unit 802 functions four times to generate the /PTOP signal 207P four times for an original to form images of four colors of CMYK (cyan, magenta, yellow and black).

After the generation of the last /PTOP signal 207P, the /PPRNT signal 206P is returned to the high-level (false) state, whereby the engine control unit 2002 detects the end of the print request from the reader controller 901, and enters a post process such as the cleaning of the intermediate transfer member 405 shown in FIG. 4.

The recording sheet bearing the transferred images passes the fixing rollers 407 shown in FIG. 6 and is discharged to the designated discharge exit. The printing operation is completed when the reader controller 901 confirms, from the engine control unit 2002, that the recording sheet is no longer transported and has been discharged, and the reader controller 901 waits in the ready state until a next print request is generated.

[Operations in Printing]

In the following there will be explained, with reference to FIGS. 11, 12 and 13, operation of the above-described image forming apparatus in case of outputting the image from the printer controller 2103 by the image forming unit 2003.

At the end of the copying operation, the reader controller 901 enters the ready state. In this state, the reader controller 901 opens the gate 2207 and the signal control circuit 2208 in preparation for the printing operation. The reader controller 901 checks, by the I/O port 2203, the printer ready state signal /PRDY 205P from the engine control unit 2002, and, if true, it sets, through the I/O port 2206, the printer ready state signal /CRDY 205C for the printer controller 2103.

Then the printer controller 2103 executes communication for various settings, and the reader controller 901 receives the communication with the serial communication controller 2205 and the CPU 2209 interprets the communication. According to the interpreted content, the reader controller 901 executes various settings on the engine control unit 2002, utilizing the serial communication controller 2202. In response to the commands, the engine control unit 2002 returns the corresponding statuses to the reader controller 901, which receives such statuses utilizing the serial communication controller 2202. The received content is interpreted by the CPU 2209, which then executes communication to the printer controller 901 through the serial communication controller 2205.

Then the printer controller 2103 sends the printer request signal /CPRNT 206C to the reader controller 901, which in response sends the printer request signal /PPRNT signal 206P to the engine control unit 2002. In response, after a predetermined time, the engine control unit 2002 returns the /PTOP signal 207P.

The signal is passed by the gate 2207 and is returned as the /CTOP signal 207C to the printer controller 2103. The printer controller 2103 transfers the /CVDO signal 211C to the reader controller 901 in synchronization with the /CV-CLK signal 209C and also in synchronization with the /CTOP signal 207C in the vertical scanning direction and with the /CLSYNC signal 208C, passed by the gate control unit 2207, in the horizontal direction.

As the reader controller 901 is so set that the selector 2201 selects the signal transmitted from the printer controller 2103, whereby the signals transmitted from the printer controller 2103 are transferred as the /PVCLK signal 209P, /PVDOEN signal 210P and /PVDO signal 211P to the engine control unit 2002.

[Difference Between Printing Operation and Copying Operation]

In the following there will be explained, with reference to FIG. 14, the difference in timing of image data transfer between the operation in printing and that in copying.

The printer controller 2103 is provided therein with an image memory (not shown) in which the image data for printing are stored in advance. Consequently the time required to output the image data signal /VDO in response to the image top request signal /TOP transmitted from the engine control unit 2103 is limited to the electrical delay.

On the other hand, in the copy mode, the image data are outputted by reading the original with the mechanical movement of the scanning unit 802 of the reader unit 101. Therefore, as will be explained later in relation to FIG. 14, there is required an acceleration time in order to bring the scanning unit 802 from the stopped state to the moving state with the original reading speed.

Figure 14:
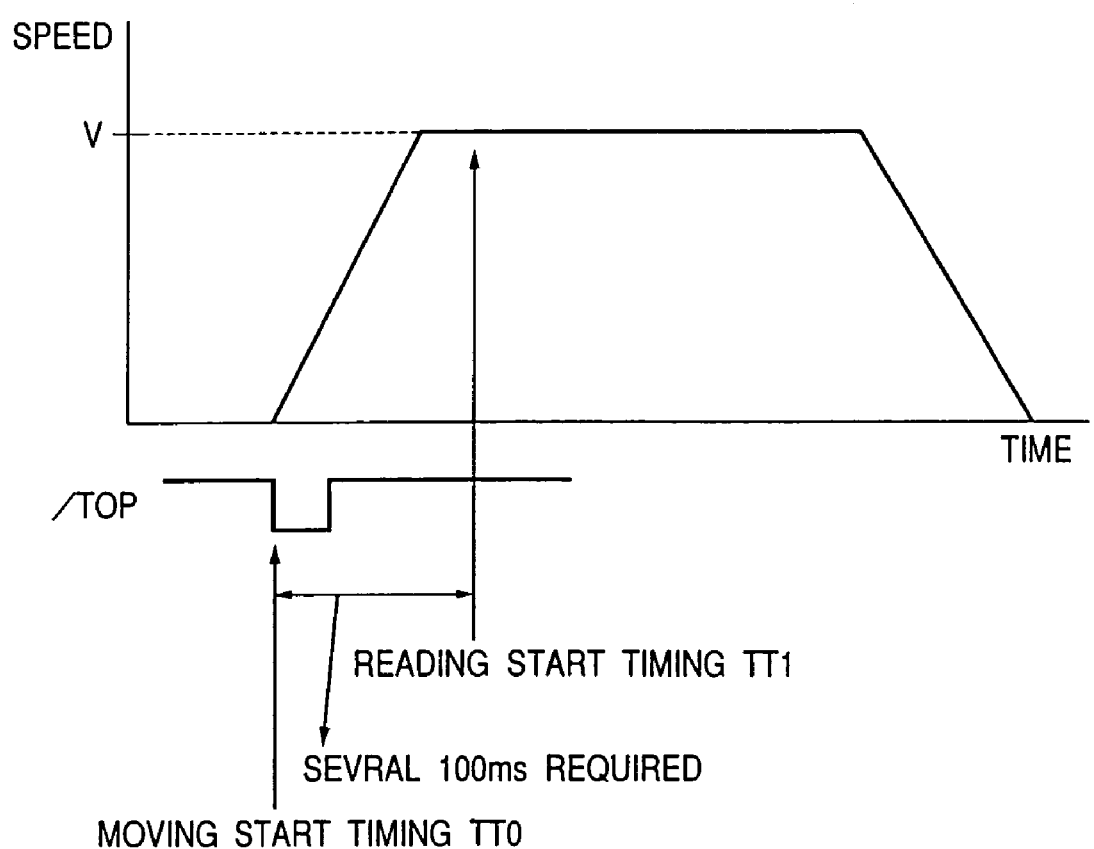
FIG. 14 is a chart schematically showing the moving speed of a scanning unit of the reader unit shown in FIG. 1.

FIG. 14 is a chart outlining the moving speed of the scanning unit 802 of the reader unit 101 shown in FIG. 1.

In FIG. 14, the abscissa indicates the time while the ordinate indicates the moving speed of the scanning unit 802. From a timing TT0 of starting the movement when the /TOP signal is transmitted to initiate the movement of the scanning unit 802, there is generally required a time for example of several hundred milliseconds to a timing TT1 for starting the original reading when the scanning unit 802 reaches the original reading speed V.

Therefore, if the engine control unit 2002 outputs the image top request signal /TOP in the copying mode at a timing same as that in the printing mode, the engine receives the print image data signal /VDO later by several hundred milliseconds in case of the copying mode.

In order to avoid such delay, there can be conceived (1) to output the /TOP signal earlier in the copying mode than in the printing mode, or (2) to provide another signal (/RSTART) for the copying mode.

The method (1) can be realized with the reader controller 901 of the internal configuration same as that shown in FIG. 12, and, in the copying mode, the reader controller 901 initiates the movement of the scanning unit 802 by the /TOP signal.

Also the method (2) can be realized with a configuration to be explained later in relation to FIG. 15.

Figure 15:
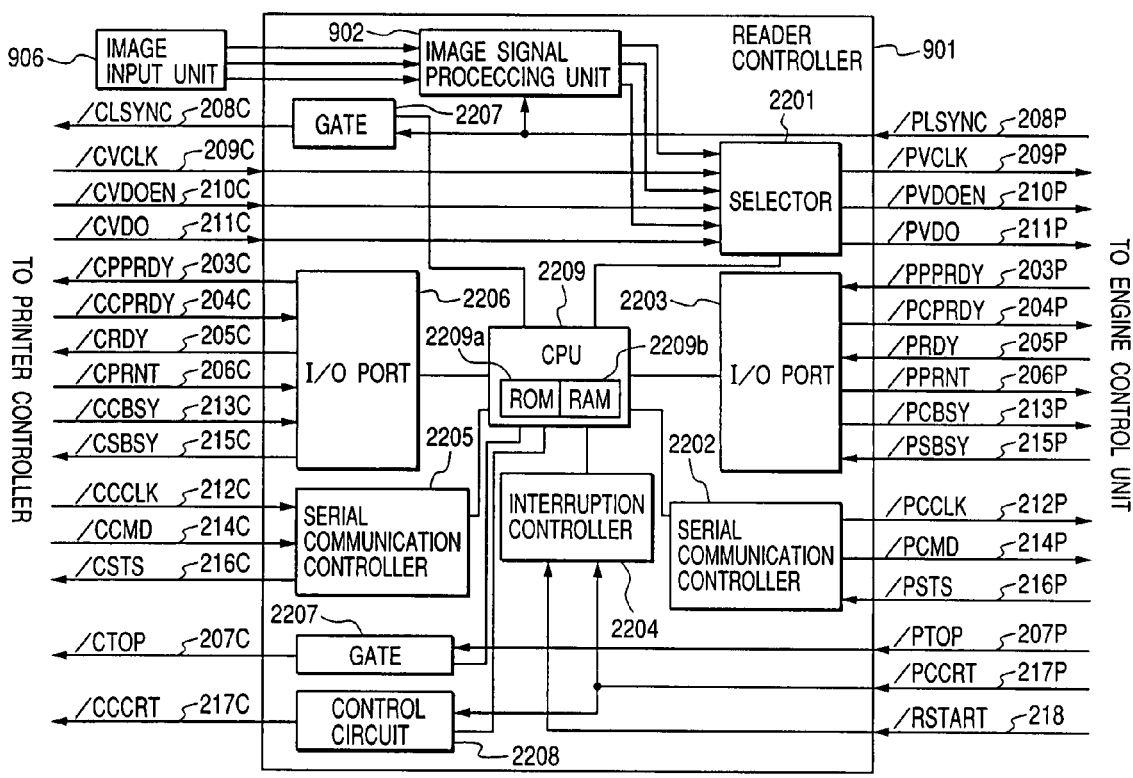
FIG. 15 is a block diagram showing the details of the reader controller shown in FIG. 11.

FIG. 15 is a block diagram showing the detailed configuration of the reader controller 901 shown in FIG. 11, and the configuration is different from FIG. 12 in that the /RSTART signal 218 from the engine control unit 2002 is inputted to the interruption controller 2204 of the reader controller 901.

The image top request signal /PTOP 207P from the engine control unit 2002 is only required in the printing operation of the printer controller 2103 and need not be supplied to the interruption controller 2204 of the reader controller 901. Also the movement start request signal /RSTART for the scanning unit from the engine control unit 2002 is only required in the copying mode and need not be supplied to the printer controller 2103.

[Control for Setting Command]

The communication between the printer controller 2103 and the engine control unit 2002 is executed in the following manner when the reader controller 901 is connected therebetween.

In the following there will be explained a case in which the printer controller 2103 sends a setting command, for example a sheet cassette changing command, to the printer while the reader controller 901 causes the engine control unit 2002 to read and output the original image (copying mode).

At first there will be explained, with reference to FIGS. 16A and 16B, the process executed by the printer controller 2103 and the engine control unit 2002 in the configuration of the printing apparatus shown in FIG. 2 without the reader controller 901.

Figure 16A:
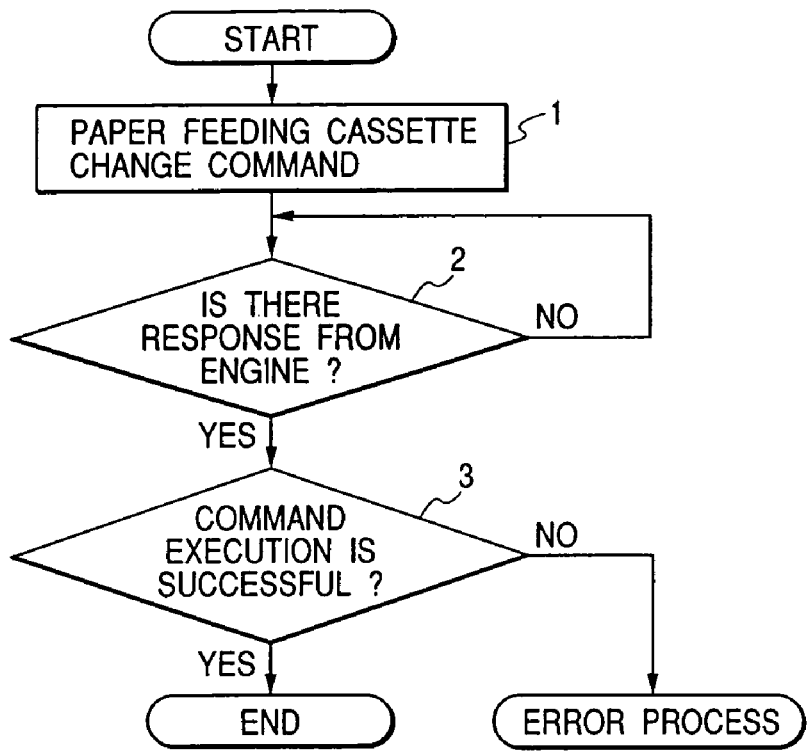
FIGS. 16A and 16B are flow charts showing an example of the data processing sequence in the printer shown in FIG. 2.
Figure 16B:
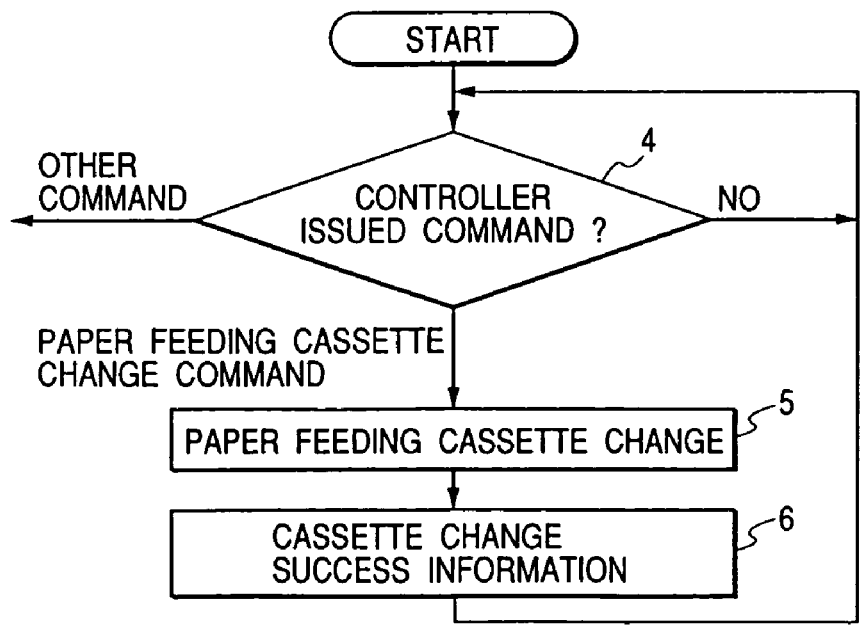

FIGS. 16A and 16B are flow charts showing an example of the data processing sequence in the printing apparatus shown in FIG. 2, wherein FIG. 16A is a flow chart showing the sequence in the printer controller 2103 while FIG. 16B is a flow chart showing that in the engine control unit 2002. These flow charts show a case, as an example, of transmission of the sheet cassette changing command from the printer controller 2103 to the engine control unit 2002, wherein numbers 1 to 6 indicate process steps.

Referring to FIG. 16A, at first the printer controller 2103 issues the sheet cassette changing command (1), then discriminates whether the response from the engine control unit 2002 has been received (2), and, if not, it waits until the response is received. If the response has been received, it discriminates whether the command has been successfully executed (3), and, if not, it executes an error process but, if successful, the sequence is terminated.

Referring to FIG. 16B, the engine control unit 2002 discriminates whether a command has been issued by the printer controller 2103 (4), and, if not, it waits until the command is issued, but, if the command is identified other than the sheet cassette changing command, the sequence branches to a process routine corresponding to the command.

On the other hand, if the step (4) identifies that the issued command is the sheet cassette changing command, the sheet cassette is changed (5), and, when such change is successful, the successful cassette change is informed to the printer controller 2103 (6) and the sequence returns to the step (4).

As explained above, after the printer controller 2103 issues the sheet cassette changing command, it waits for the response from the engine control unit 2002, and, upon receiving the response, it discriminates the result of the process corresponding to the command, thereby terminating the command issuing sequence. The engine control unit 2002, upon receiving the command from the printer controller 2103, judges the content of the command, and, if it is the sheet cassette changing command, it informs the printer controller 2103 of the successful execution of the command when the cassette change is successfully made.

In the following there will be explained the communication and control between the printer controller 2103 and the engine control unit 2002 in the image forming apparatus of the present embodiment, in which the reader controller 901 is connected between the printer controller 2103 and the engine control unit 2002.

Figure 17A:
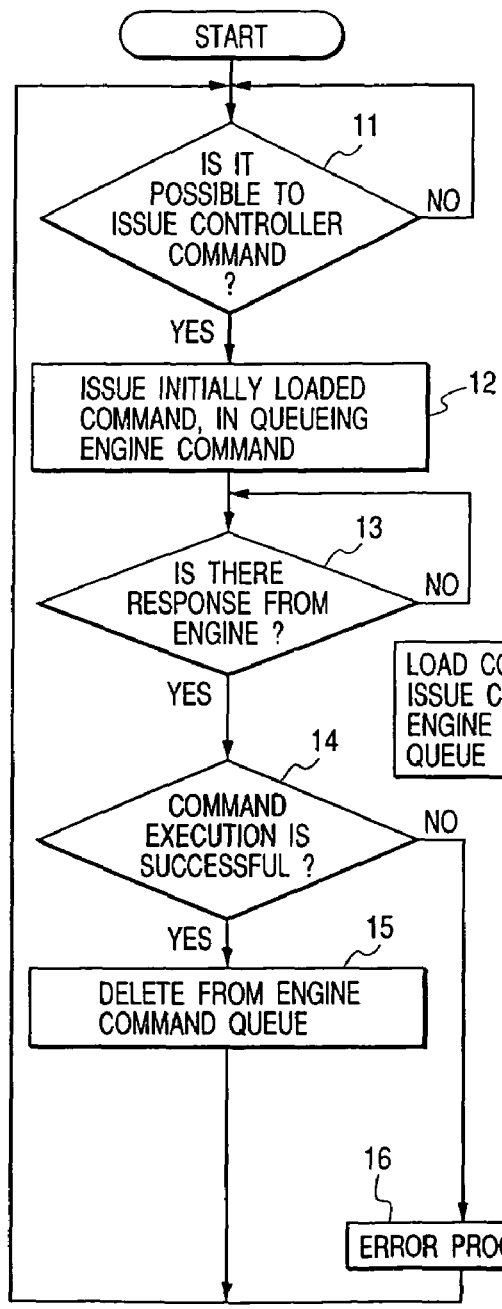
FIGS. 17A and 17B are flow charts showing an example of the first data processing sequence in the image forming apparatus in an embodiment of the present invention.
Figure 17B:
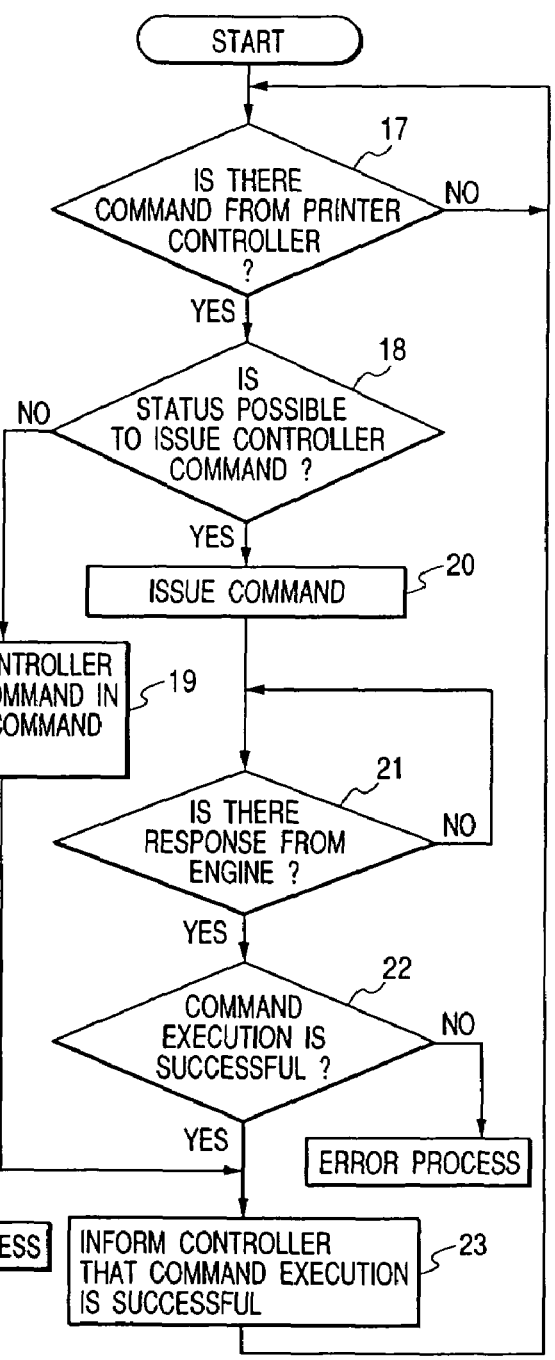

FIGS. 17A and 17B are flow charts showing an example of the first data processing sequence in the image forming apparatus of the present embodiment, corresponding to the configuration having the reader controller 901 between the printer controller 2103 and the engine control unit 2002 shown in FIG. 11 and also corresponding to the process sequence executed by the CPU 2209 of the reader controller 901 according to the program stored in the ROM 2209a. The printer controller 2103 and the engine control unit 2002 execute controls identical with those shown in FIG. 10. Numbers 11 to 23 in FIGS. 17A and 17B indicate process steps.

FIG. 17A is a flow chart to be executed in case the reader controller 901 is in a state capable, without affecting the state thereof, of sending the command received from the printer controller 2103 to the engine control unit 2002, and FIG. 17B is a flow chart showing the control of receiving the command transmitted from the printer controller 2103 and returning the status thereto.

At first there will be explained, with reference to FIG. 17A, a case where the reader controller 901 is in a state capable, without affecting the state thereof, of sending the command received from the printer controller 2103 to the engine control unit 2002.

At first the reader controller 901 discriminates whether it can issue the command received from the printer controller 2103 to the engine control unit 2002 (11), and, if not, it waits until the command issuance becomes possible, but, if command issuance is identified possible, the reader controller 901 issues a command, loaded in the engine command queue, to the engine control unit 2002 utilizing the serial communication controller 2202 and the /PCMD signal 214P (12). It then discriminates whether a response has been received from the engine control unit 2002 for the command issued in the step (12).

Also the command issued by the reader controller 901 itself is transmitted to the engine control unit 2002 by the /PCMD signal 214P. When the execution of the command is completed, the engine control unit 2002 returns a response to the reader controller 901 by the /PSTS signal 216P.

If the step (13) identifies that the response has not been received, the sequence waits until the response is received, but, if the response has been received, there is discriminated whether the command has successfully been executed (14). If the execution of the command is identified successful, the command is deleted from the engine command queue (15) and the sequence returns to the step (11). If the execution of the command is identified not successful, there is executed an error process (16) and the sequence returns to the step (11).

Referring to FIG. 17B, the reader controller 901 at first causes the serial communication controller 2205 to receive the command from the printer controller 2103 by the /CCMD signal 214C shown in FIG. 11 (17), and discriminates whether the received command can be issued to the engine control unit 2002 (18).

If the step (18) identifies that the controller command cannot be issued to the engine control unit 2002, for example because the copying operation currently executed by the reader controller 901 with a designated sheet cassette is hindered by the issuance of the sheet cassette changing command from the printer controller 2103 to the engine control unit 2002, the reader controller 901 does not issue such command to the engine control unit 2002 but load such command in the engine command queue which stores, in the order of issuance, the commands to be issued from the printer controller 2103 to the engine control unit 2002 (19) and the sequence proceeds to a step (23).

On the other hand, if the step (18) identifies that the controller command can be issued to the engine control unit 2002, for example because the reader controller 901 does not have any command under current execution in the engine control unit 2002 in the copying mode, the reader controller 901 issues a command, same as that transmitted from the printer controller 2103, to the engine control unit 2002 utilizing the serial communication controller 2202 and the /PCMD signal 214P (20).

It then discriminates whether a response has been received from the engine control unit 2002 (21), and, if received, it discriminates whether the command execution has been successful (22). If not, there is executed an error process, but, if successful, the successful command execution is informed to the printer controller 2103 by the serial communication controller 2205 and the /CSTS signal (23) and the sequence returns to the step (17).

On the other hand, even when the step (19) loads the command in the engine command queue, a response has to be returned to the printer controller 2103. Therefore the reader controller 901 returns a pseudo response of successful command execution to the printer controller 2103 by the serial communication controller 2205 and the /CSTS signal (23).

As explained in the foregoing, the command process sequence can proceed without inconvenience in the ordinary command issuance from the printer controller 2103 to the engine control unit 2002 even in the presence of the reader controller 901 therebetween.

[Process for State Change Signal]

In the following there will be explained, in the image forming apparatus of the present embodiment having the reader controller 901 between the printer controller 2103 and the engine control unit 2002, the process in case a state change in the engine (image forming unit 2003), for example an error state, is transmitted by the /PCCRT signal 217P from the engine control unit 2002 to the reader controller 901.

In the configuration shown in FIG. 9 including the reader controller 901, the state change in the engine to be known by the reader controller 901 may be different from that to be known by the printer controller 2103. Such situation may arise for example in case the sheet in transportation is jammed.

For example, if a sheet jamming occurs in the copying operation of the engine under the control of the reader controller 901, such state change is to be informed only to the reader controller 901, because the printer controller 2103 cannot execute any appropriate post process even if such state change is informed, as the sheet jamming is not in the course of data output under the instruction of the printer controller 2103.

On the other hand, if the printer controller is to be provided with a control system equivalent to that of the reader controller 901, each of the controllers has to be given a jam processing software that is provided in the other controller. Such configuration is superfluous and wasteful in the designing, evaluation and software capacity. Consequently, the engine state is basically informed to the printer controller 2103 in the printing mode and to the reader controller 901 in the copying mode.

However, even in the copying mode, the engine state change signal may have to be informed also to the printer controller 2103 in certain cases. For example the information on the change in the sheet size in the sheet cassette or on the absence of recording sheet has to be informed to the printer controller 2103. Nevertheless, for such information, the time from the issuance of the state change signal in the engine control unit 2002 to the corresponding process in the controllers is not strictly limited.

Figure 18:
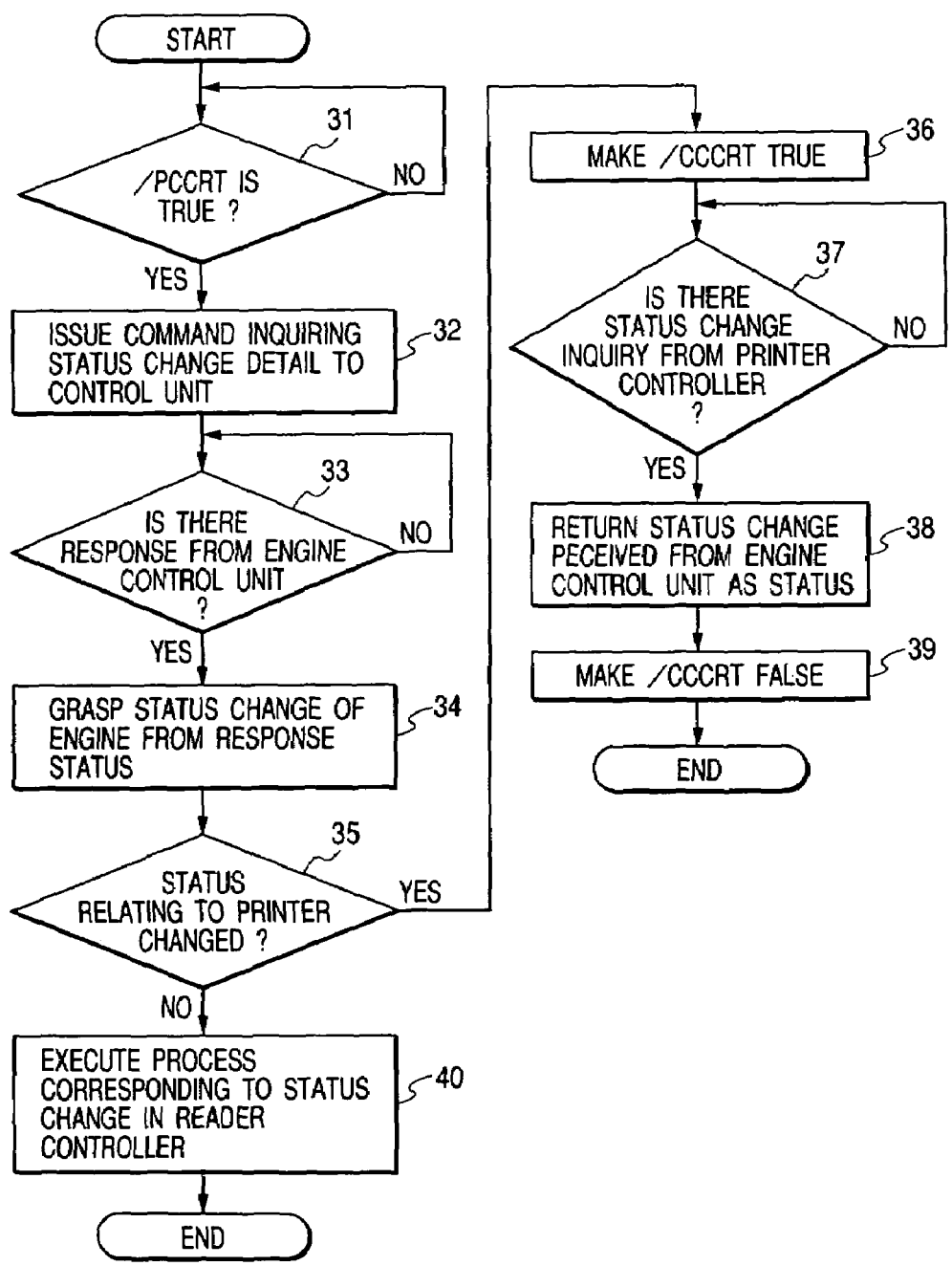
FIG. 18 is a flow chart showing an example of the second data processing sequence in the image forming apparatus of the above-mentioned embodiment.

Consequently there is executed a process as shown in a flow chart in FIG. 18. More specifically, in the copying mode in which the reader controller 901 controls the engine control unit 2002, the state change signal /PCCRT 216P informed from the engine control unit 2002 is masked, by the gating function of the control circuit 2208, from the printer controller 2103 and is received solely by the reader controller 901 through the interruption controller 2204.

FIG. 18 is a flow chart showing an example of the second data process sequence in the image forming apparatus of the present embodiment, corresponding to the sequence executed by the CPU 2209 of the reader controller 901 shown in FIG. 11 according to the program stored in the ROM 2209*a*, wherein numbers 31 to 40 indicate process steps.

At first there is discriminated whether the /PCCRT signal 216P has become true (31), and, if not, the sequence waits until the signal becomes true, but, if true, the reader controller 901 issues a command for acquiring the state change to the engine control unit 2002 (32).

Then there is discriminated whether a response has been received from the engine control unit 2002 (33), and, if not, the sequence waits until the response is received, but, if received, the engine state change is identified from the response status (34).

Then there is discriminated whether the content of the status is to be informed also to the printer controller 2103 (35), and, if to be informed, for example a change in the sheet size in the sheet cassette, the control circuit 2208 is caused to set a flag, thereby generating the state change signal /CCCRT 217C (36). There is discriminated whether the state change has been inquired from the printer controller 2301 (37), and, if not, the sequence waits until the inquiry is generated, but, if inquired, the state change received from the engine control unit 2002 is returned as a status to the printer controller 2103 (38). Then the /CCCRT signal 217C is shifted to the false state (39) and the sequence is terminated.

On the other hand, if the step (35) identifies that the state change of the engine need not be informed to the printer controller 2103, the reader controller 901 executes a process for such state change (40) and the sequence is terminated.

On the other hand, in the printing mode in which the printer controller 2103 controls the engine control unit 2002, the gating function of the control circuit 2208 is opened to transmit the state change signal /PCCRT signal 217P from the engine control unit 2002 as the /CCCRT signal 217C to the printer controller 2103.

[Control for Execution Command]

In the following there will be explained the control on the execution command, for example the control executed by the reader controller 901 in case the printer controller 2103 and the reader controller 901 simultaneously issue commands for using the engine control unit 2002.

Figure 19:
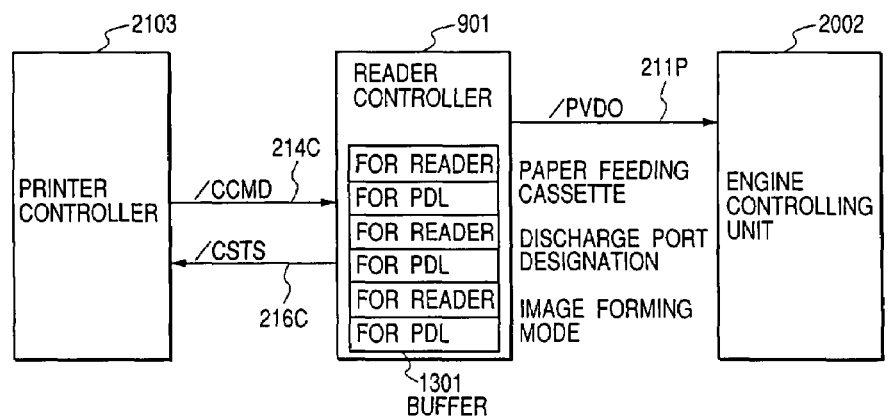
FIG. 19 is a view showing the data location and the transfer thereof in case a print request is generated in the course of a copying operation in the printer controller, the reader controller and the engine control unit shown in FIG. 11.

FIG. 19 shows the location and transfer of the data in the printer controller 2103, the reader controller 901 and the engine control unit 2002 in case a print request is generated in the course of a copying operation, wherein components same as those in FIG. 11 are represented by same numbers.

The engine control unit 2002, controlling the engine in the copying operation, controls image formation by receiving the image signal /PVDO 211P from the reader controller 901.

The conditions of the copying operation, such as the sheet cassette, sheet discharge exit, image forming mode etc. have already been set by the serial communication between the reader controller 901 and the engine control unit 2002 as explained in relation to FIG. 9.

A buffer 1301 stores various set values such as those set in the engine control unit 2002 by the reader controller 901 and those by the printer controller 2103. The set values stored in the buffer 1301 include the aforementioned designated values for the reader.

Even if a print request is generated from the printer controller 2103 in the course of the copying operation, it is not appropriate, from the standpoint of usability, to execute the printing operation by interrupting the copying operation. Therefore, the print request under such situation is postponed until the completion of the copying operation.

However, in response to the /CCMD signal 214C from the printer controller 2103, the /CSTS signal 216C has to be returned. Therefore, among the set values stored in the buffer 1301, those from the printer controller 2103 are stored, according to request, in a set area for PDL. In case the set value for reader is different from that for PDL, the reader controller 901 may execute setting on the engine control unit 2002 after the copying operation and before the start of the printing operation. This will be explained in the following by a specific example.

It is assumed that the copying operation is being executed with the sheet feeding from the upper cassette 408 shown in FIG. 6 and with the sheet discharge to the face-up discharge exit 417, and with the color image forming mode based on the judgement that the original is colored.

In case a print request is generated from the printer controller 2103 under such situation, the execution of printing is postponed until the completion of the copying operation, but the printer controller 2103 can execute various settings. It is assumed that the print request is to be executed with the sheet feeding from the upper cassette 408, sheet discharge to the face-down discharge exit 418 and black-and-white image output. Thus the upper cassette 408 is designated by both the reader controller 901 and the printer controller 2103.

Consequently, when the copying operation is terminated and is switched to the printing operation, the sheet cassette designating command need not be issued to the engine control unit 2002. On the other hand, as the discharge exit and the image forming mode are different between the copying operation and the printing operation, the commands for designating the sheet discharge exit and the image forming mode have to be issued again from the reader controller 901 to the engine control unit 2002 at the end of the copying operation.

As explained in the foregoing, the reader controller 901 not only judges whether to postpone the execution by the engine control unit 2002 of the command from the printer controller 2103 but also avoids overlapped setting of the conditions already set by the reader controller 901 in the engine control unit 2002.

In the following there will be explained, with reference to FIGS. 20 and 21, a case of generation of a copy request in the course of a printing operation. In this case, in contrast to the aforementioned case of print request in the course of copying operation, it is appropriate, from the standpoint of usability, to allow the copying operation by interrupting the printing operation.

Figure 20:
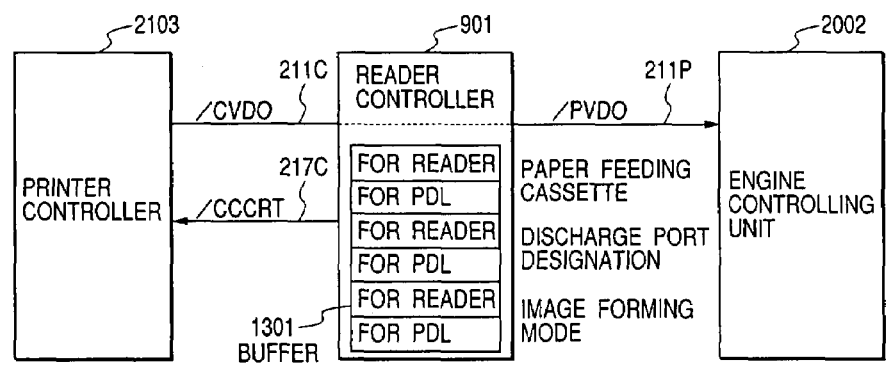
FIG. 20 is a view showing the data location and the transfer thereof in case a copy request is generated in the course of a printing operation in the printer controller, the reader controller and the engine control unit shown in FIG. 11.

FIG. 20 shows the location and transfer of the data in the printer controller 2103, the reader controller 901 and the engine control unit 2002 shown in FIG. 11 in case a copy request is generated in the course of a printing operation, wherein components same as those in FIG. 19 are represented by same numbers.

Referring to FIG. 20, while the printing operation is being executed, the /CVDO signal 211C from the printer controller 2103 is selected by the selector 2201 shown in FIG. 12 and is transferred as the /PVDO signal 211P to the engine control unit 2002. It is assumed that the printer controller 2103 designates, as already explained in FIG. 19, the conditions of sheet feeding from the upper cassette 408, sheet discharge to the face-down discharge exit 418 and black-and-white image output.

The engine control unit 2002 does not know the number of prints to be made, since the end of the printing operation can only be detected when the /PPRNT signal from the printer controller 2103 assumes the high-level (false) state. In the following description, it is assumed that the printer controller 2103 is to print four images.

Unless the reader controller 901 requests the copying operation by interruption, the engine control unit 2002 generates the /PTOP signals 207P four times as indicated in the timing chart shown in FIG. 7, and the images are correspondingly transferred from the printer controller 2103 to the engine control unit 2002 through the reader controller 901.

It is assumed that an interruption copying request for a single copy of the color original is generated in the reader controller 901 during the printing of the second copy. The operations in such situation will be explained with reference to FIG. 21.

Figure 21:
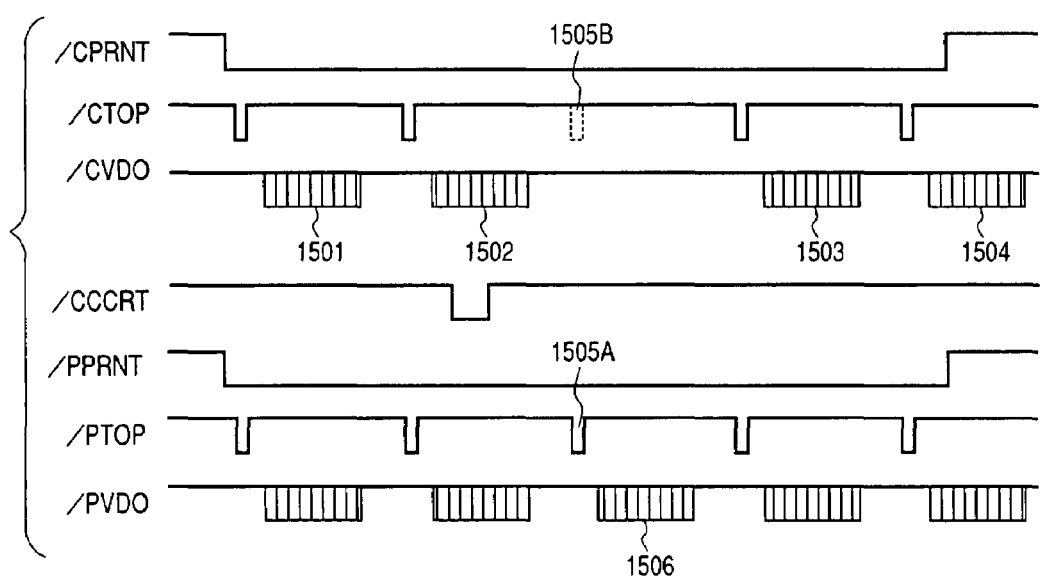
FIG. 21 is a timing chart showing the signals in case a copy request is generated in the course of a printing operation in the image forming apparatus of the above-mentioned embodiment.

FIG. 21 is a timing chart showing signals in case the copy request is generated in the course of the printing operation in the image forming apparatus of the present embodiment.

In FIG. 21, image data 1501 to 1504 for four images are transmitted from the printer controller 2103 to the reader controller 901. A signal 1501A is the /PTOP signal transmitted from the engine control unit 2002 to the reader controller 901 after the interruption by the copying request. A signal 1505B is the /CTOP signal that should have been transmitted to the printer controller 2103 in case the copying operation has not been interrupted. Data 1506 are the image data of the interrupting copying operation.

In response to the request by the /CPRNT signal 206C from the printer controller 2103, the reader controller 901 issues a request by the /PPRNT signal 206P to the engine control unit 2002, which in response sends the /PTOP signal 207P through the reader controller 901 to the printer controller 2103 as the /CTOP signal 207C. Thus the printing operation is executed for the first image represented by the image data 1501 and the second image represented by the image data 1502.

In the following there will be explained a case where the reader controller 901 generates an interruption copying request in the course of printing operation of the second image. The reader controller 901 sends the /CCCRT signal 217C to the printer controller 2103. This signal is generated not because of an actual state change in the engine but to request that the printer controller 2103 releases the printer engine in order that the reader can acquire the printer engine.

The signal is generated by the control circuit 2208 shown in FIG. 15 as explained in the foregoing. In response to the CCCRT signal 217C, the printer controller 2103 issues a command for checking the status of the printer engine, and the reader controller 901 in response returns a status indicating that the copying operation is in progress.

Thus, the printer controller 2103, while maintaining the /CPRNT signal 206C in the low-level (true) state, continues to wait the transmission of the /CTOP signal 207C. In case the copying operation is not in progress, the /CPRNT signal 206C is maintained in the low-level (true) state and the time-out error is generated after a predetermined time if the /CTOP signal 207C is not transmitted in this state. However, the setting is so made that, in case the copying operation is in progress, the printer controller 2103 cancels such time-out error so that the /CTOP signal 207C is awaited endlessly.

After the generation of the copying request, the signal 1505A of the /PTOP signal 207P from the engine control unit 2002 is for the copying operation, and the reader controller 901 utilizes such /PTOP signal 207P. However the signal 1505A is masked from the printer controller 2103 by the gate 2207, as indicated by 1505B.

The image signal actually generated in the reader controller 901 is the image signal only of the image data 1506. Then, after the completion of a single interruption copying, the /PTOP signal 207P is unmasked and transmitted as the /CTOP signal 207C to the printer controller 2103, whereby the image data 1503 and 1504 therefrom can be transmitted to the engine control unit 2002 for printing. It is thus possible to realize the interruption copying operation in the course of the printing operation.

In this manner the reader controller 901 judges and controls, according to the situation of the printer controller 2103 and the reader controller 901, the acquisition of the printer engine (image forming unit 2003) and the timing of command issuance to satisfy the requests from two controllers to one engine.

[Control for Setting Confirmation Command]

In the following there will be explained the control in case the printer controller 2103 issues a setting confirmation command.

In case the printer controller 2103 wishes to confirm the state set in the engine control unit 2002, the printer controller 2103 issues a command for confirming the content of setting by the /CCMD signal 214C. In response, the reader controller 901 checks the buffer 1301 shown in FIG. 19 for storing the settings. If the content which the printer controller 2103 wishes to confirm is contained in the buffer 1301, the reader controller 901 reads such content and sends it to the printer controller 2103 by the /CSTS signal 216C. If the desired content is not stored in the buffer 1301, the reader controller 901 issues a setting confirmation command by the /PCMD signal 214P.

The engine control unit 2002 reads the content of setting stored in an unrepresented memory and sends the read content by the /PSTS signal 216P to the reader controller 901, which in turn informs the content by the /CSTS signal 216C to the printer controller 2103.

[Two-Image Formation (Retention) Mode]

In the following there will be explained a case of outputting, in the two-image formation mode, the black-and-white image read by the scanning unit 802. When the black-and-white mode key 2709 and the copy start key 2703 are depressed in succession on the operation unit 905 shown in FIG. 13, the reader controller 901 executes aforementioned settings for executing the copying mode and causes the original feeding device 801 shown in FIG. 10 to feed the original onto the original table 102.

In this operation, the original feeding device 801 informs the reader controller 901 of the original size detected by the sensor 801a. The reader controller 901 determines the size of the output sheet based on various settings such as the informed original size and the image magnification, and judges that the two-image formation mode is possible if thus determined size of the output sheet can be placed in two units on the intermediate transfer member 405 shown in FIG. 6.

At first the sheet cassette for feeding the recording sheet is determined according to the original size and a corresponding designating command is issued. Then issued is a command for requesting the size of the recording sheet in the designated cassette. In response to these commands, the engine control unit 2002 returns corresponding statuses.

Then the sheet discharge exit is determined by a designating command, and a page mode designation command for designating the two-image formation is issued based on the above-mentioned judgement. Finally there is issued a command designating the black-and-white printing whereby all the settings in the printer are completed.

Then the reader controller 901 sends the print request signal /PPRNT 206P to the engine control unit 2002, which in response returns the /PTOP signal 207P after a predetermined time. The response is processed by the interruption controller 2204 and is used for operating the scanning unit 802 in synchronization with the /PTOP signal 207P.

The /PVDO signal 211P, entered from the photoelectric conversion unit 104 to the image processing unit 902, is transferred to the engine control unit 2002 in synchronization with the /PVCLK signal 209P, also in synchronization with the /PTOP signal 207P in the vertical direction and with the /PLSYNC signal 208P in the horizontal direction. Since the black-and-white mode is selected, the image of K (black) color is formed by a single function of the scanning unit 802 and in response to a single /PTOP signal 207P.

After the optical reading of the K color by the scanning unit 802 is completed, the original feeding device 801 immediately exchanges the original. In case of the two-image formation mode, the /PTOP signal 207P is generated twice during one turn of the intermediate transfer member 405. After the exchange of the original, the scanning unit 802 functions in synchronization with the second /PTOP signal 207P to read the original image, and the image is outputted according to a process same as that for the first image. The process is executed according to the timing to be explained in relation to FIG. 22.

Figure 22:
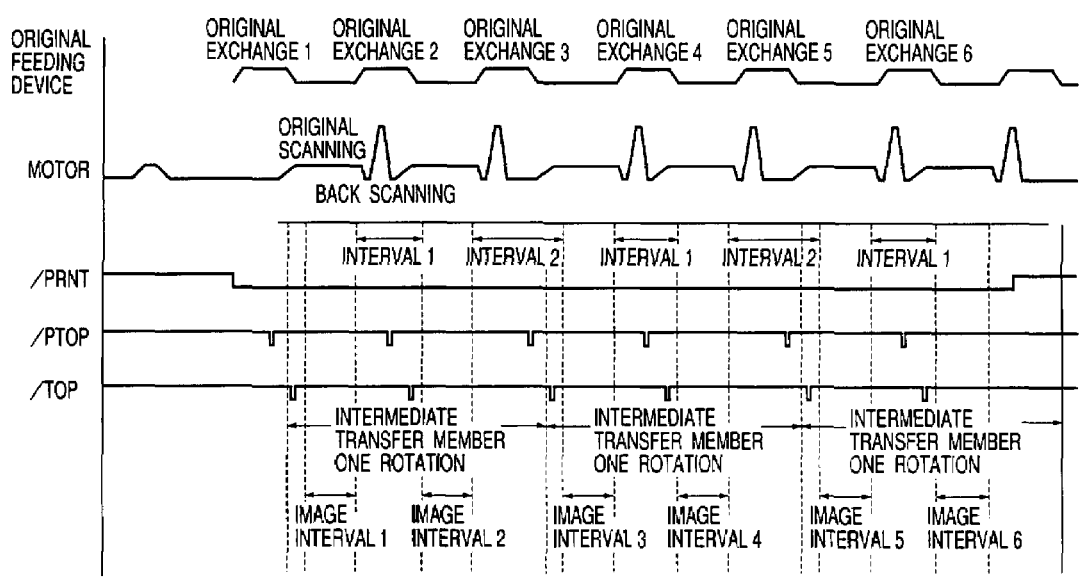
FIG. 22 is a timing chart showing the function in a monochromatic two-image formation mode in the image forming apparatus of the above-mentioned embodiment.

FIG. 22 is a timing chart showing the functions in the black-and-white two-image formation mode in the image forming apparatus of the present embodiment.

In FIG. 22, original exchanges 1 to 6 indicate the timings from the start of original exchange to the end thereof in the original feeding device 801. Intervals 1, 2 indicate the periods in which the exchange of the original is possible. An image interval 3 indicates the period of original scanning by the scanning unit 802.

The original exchanges 1, 2, 3, . . . indicate the timings of feeding to the original table of the originals to be scanned in the image intervals 1, 2, 3, . . . Thus two images are scanned during one turn of the intermediate transfer member 405 and are developed thereon.

In the foregoing there has been explained the two-image formation mode with the black (K) color, but the operation is same in the two-image formation mode with any one of yellow, magenta and cyan colors.

[Two-Image Formation (Retention) Inhibition Mode]

In the following there will be explained the part featuring the present embodiment, based on the foregoing description.

In the timing chart shown in FIG. 22, the intervals 1, 2 are available for the original exchange. In the present embodiment there is considered a case where the intervals 1 and 2 are different in length. The interval 2 is selected longer since the developing unit has to be changed in this interval in the full-color mode.

The original exchange in the shorter interval 1 can be usually satisfactorily achieved in case of the ordinary original, but may not be achieved in case of a slippery or bent original (original difficult to transport). In the conventional image forming apparatus, such situation is judged as a jam in the original feeding device and the copying operation is interrupted. However, in the image forming apparatus of the present embodiment, there is provided a mode in which a slight delay in the original exchange is not judged as the jam and the process can be continued.

At the original exchange, the sensor 802b detects and transmits the timing of completion of the original exchange to the reader controller 901, which can therefore identify the amount of delay in the original exchange in the original feeding device 801.

Figure 23:
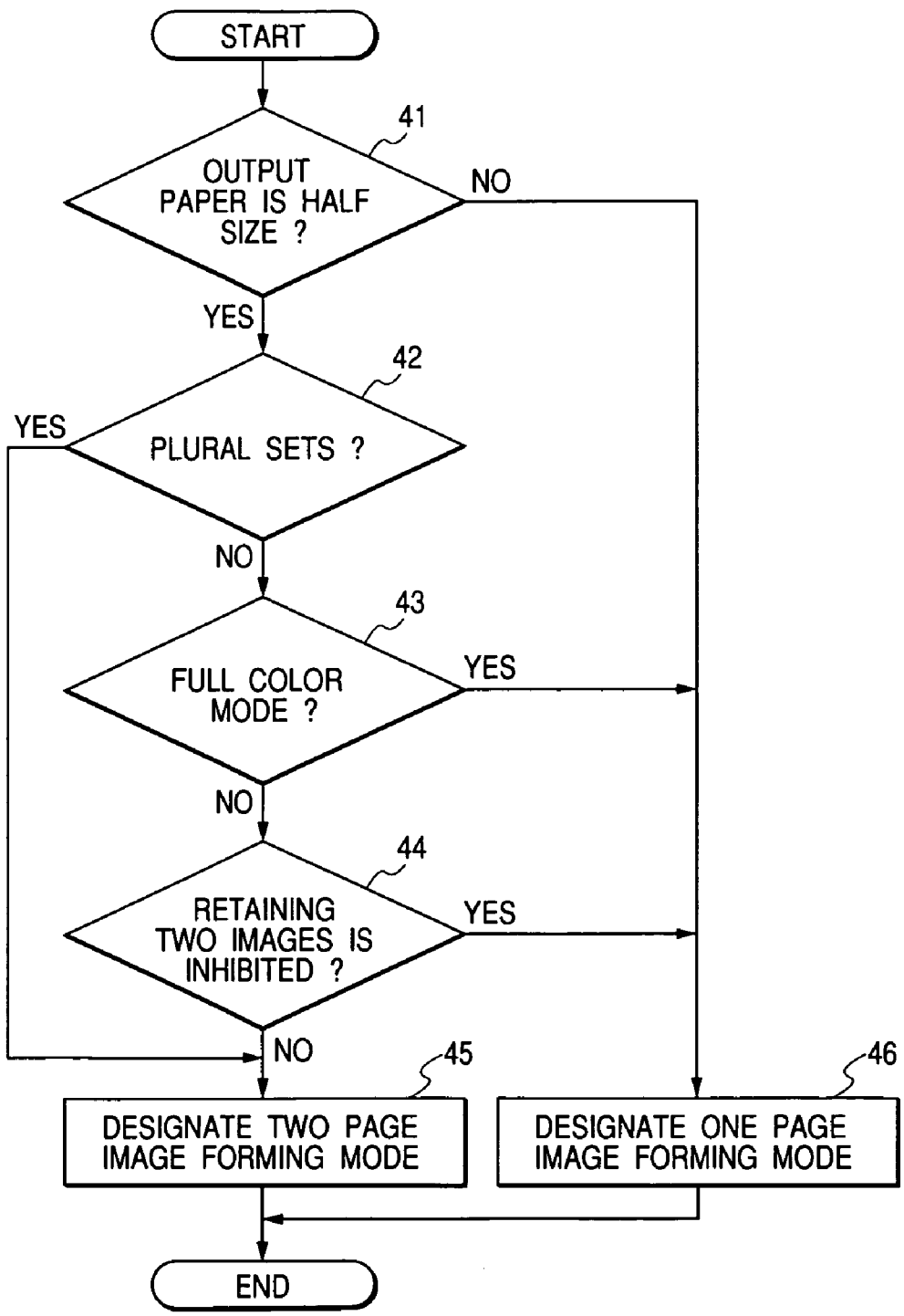
FIG. 23 is a flow chart showing an example of the third data processing sequence in the image forming apparatus of the above-mentioned embodiment.

The operation unit 905 shown in FIG. 13 is provided, in the display area 2701, with a "one-image formation" mode, namely a two-image formation inhibiting mode, to be designated by the touch key 2718. FIG. 23 is a flow chart showing the sequence for determining the operation mode in case such two-image formation inhibiting mode is designated.

In the following there will be explained, with reference to FIG. 23, the process for determining the page formation mode after the determination of the output sheet size.

FIG. 23 is a flow chart showing an example of the third data processing sequence in the image forming apparatus of the present embodiment, wherein numbers 41 to 46 indicate process steps.

At first there is discriminated whether the determined sheet size is a full size or a half or smaller size (41), and, if full size, the 1-page formation (retention) mode (1-image formation (retention) mode) is set because the 2-page formation (retention) mode (2-image formation (retention) mode) cannot be executed (46) and the sequence is terminated. On the other hand, if the sheet size is discriminated as the half or smaller size, there is discriminated the number of copies (42), and, if the number of copies is identified as not plural but one, there is discriminated whether the full-color mode is selected (43). If the full-color mode is identified, the 1-page formation mode is set because the 2-page formation mode cannot be executed (45) and the sequence is terminated. If the number of copies is identified as plural, the 2-page formation mode is set (45) and the sequence is terminated.

On the other hand, if the step (43) identifies the black-and-white mode or monochromatic mode (image formation with one of yellow, cyan and magenta colors), there is discriminated whether the two-image formation (retention) inhibiting mode (1-image formation (retention) mode) is selected (44), and, if selected, the 1-image formation mode is set because the 2-image formation mode is possible in combination but is inhibited (45) and the sequence is terminated. If the 2-image formation inhibiting mode is not identified, there is set the 2-page formation mode (2-page formation with two consecutive originals) (45) and the sequence is terminated.

After the process explained above, the image forming unit 2003 executes the image formation according to the mode set in the step (45) or (46).

Figure 24:
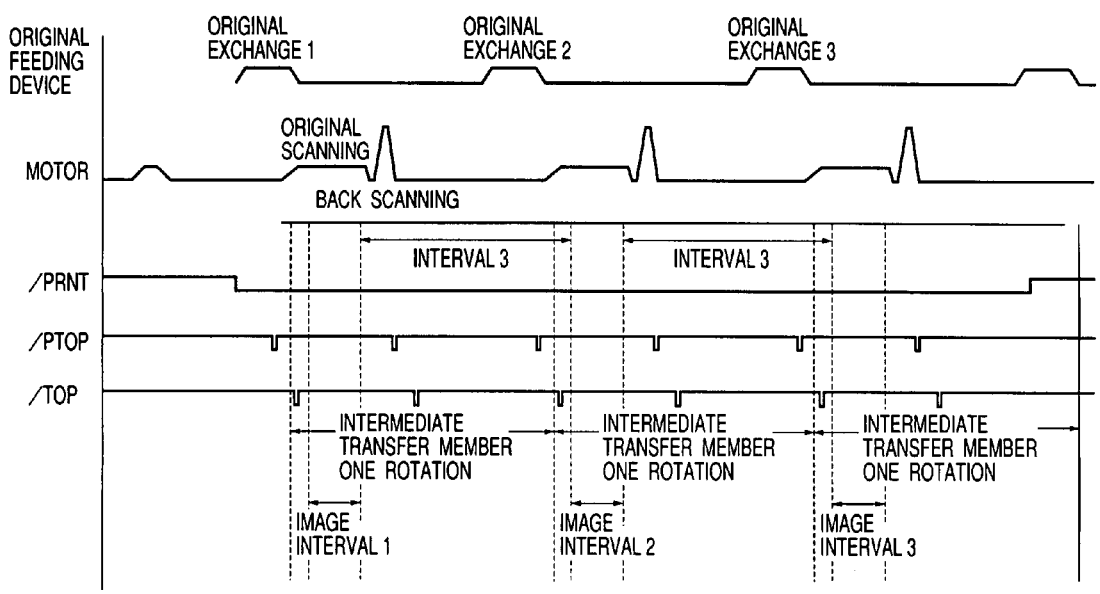
FIG. 24 is a timing chart showing the function in case the two-image formation mode is inhibited in the image forming apparatus of the above-mentioned embodiment.

In case the 2-page formation mode is inhibited and the 1-page formation mode is set, the process is executed according to the timing shown in the timing chart in FIG. 24.

FIG. 24 is a timing chart showing the operations in case the 2-page formation mode is inhibited in the image forming apparatus of the present embodiment.

In FIG. 24, original exchanges 1 to 3 indicate the timings from the start of original exchange to the end thereof in the original feeding device 801. Interval 3 indicates the period in which the exchange of the original is possible. An image intervals 1 to 3 indicates the periods of original scanning by the scanning unit 802.

In the 2-page formation (retention) mode (2-image formation (retention) mode), the original exchange is permitted only in the intervals 1, 2 in FIG. 22, while, in the 1-page formation (retention) mode (two-image formation (retention) inhibiting mode), it is permitted in the interval 3 shown in FIG. 24. Consequently originals difficult to exchange may be exchanged in continuation without jamming.

In the present embodiment there has been explained the case of inhibiting the two-image formation mode with two originals according to the instruction of the user, but it is also possible to simply inhibit the two-image formation mode. However, the two-image formation mode for forming plural outputs from a same original has lower possibility of delay in the original exchange, because the original exchange in the interval 1 shown in FIG. 22 is unnecessary, in comparison with the two-image formation mode with two originals. Therefore, in case of forming plural outputs from a same original, it is possible to improve the productivity by executing the image formation by the two-image formation mode even if the operation unit 905 instructs the two-image formation inhibiting mode. Also in case of outputting the image received from the host computer, the above-described drawback is not encountered because the original exchange is unnecessary. Consequently the image formation is executed by the two-image formation mode in such case, even if the operation unit 905 instructs the two-image formation inhibiting mode.

Figure 25:
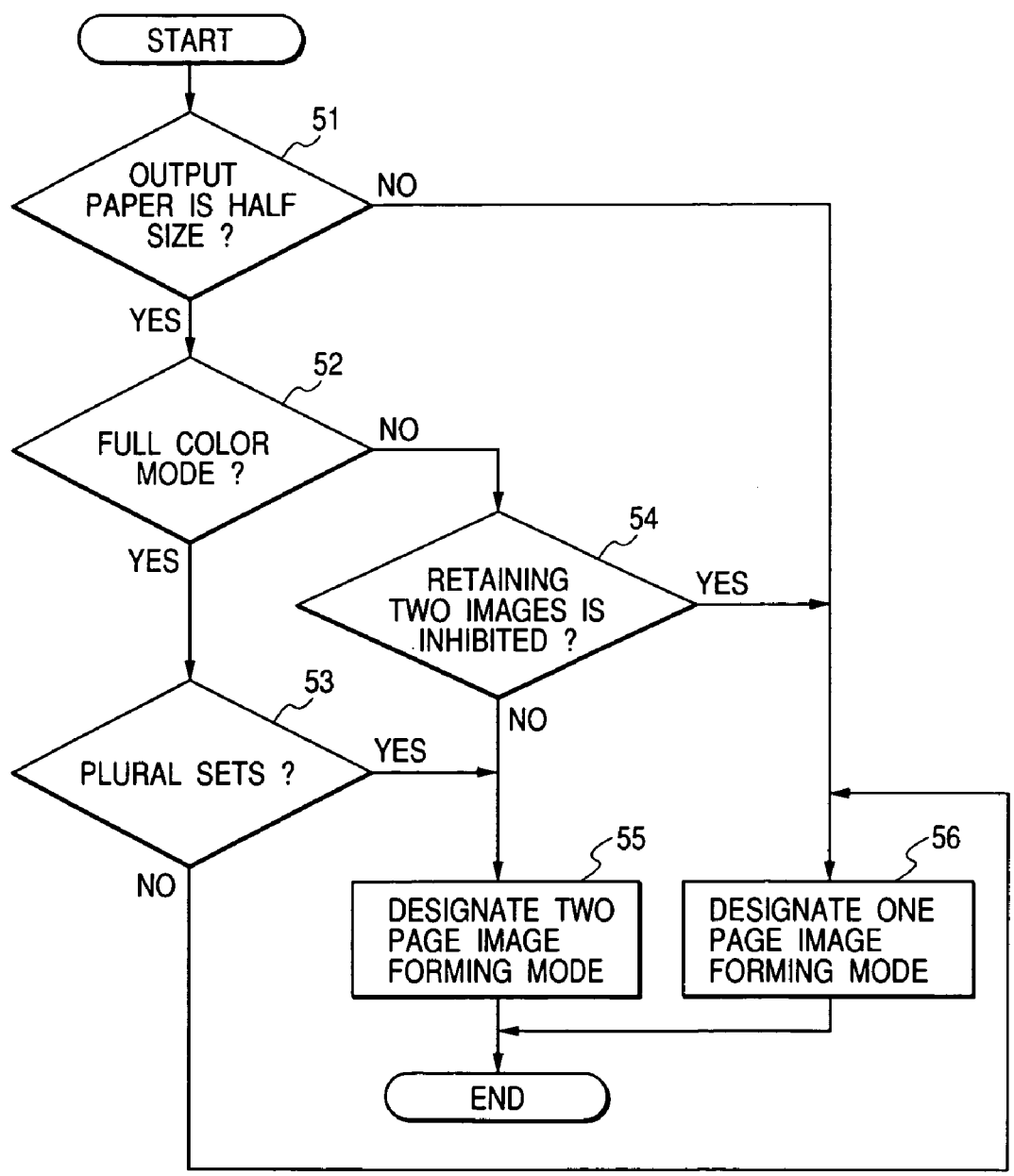
FIG. 25 is a flow chart showing an example of the fourth data processing sequence in the image forming apparatus of the above-mentioned embodiment.
Figure 26:
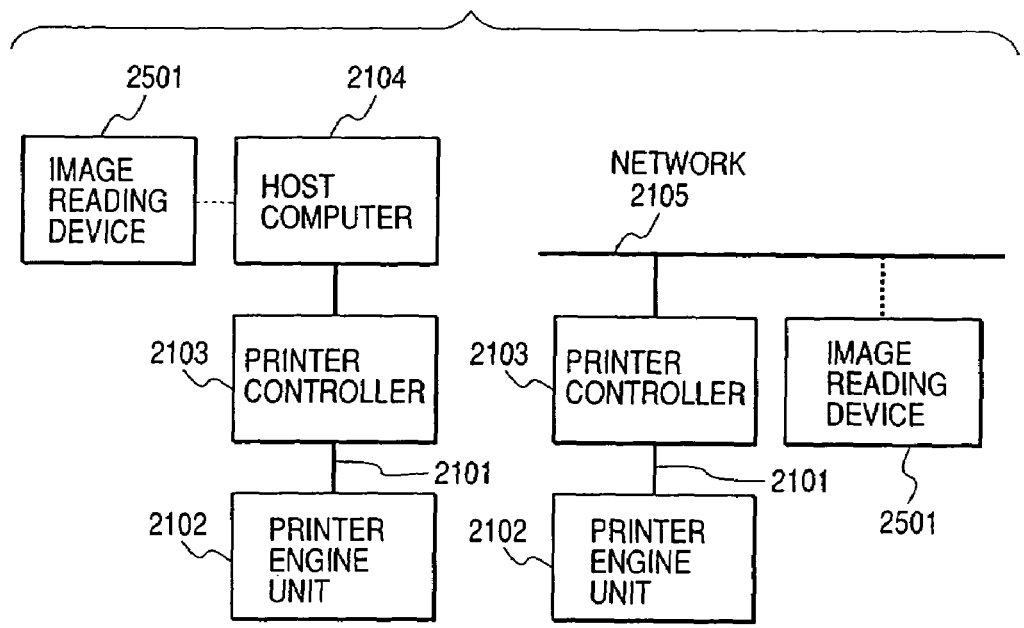
FIGS. 26 and 27 are block diagrams showing the connection of the reader in the conventional image forming apparatus.
Figure 27:
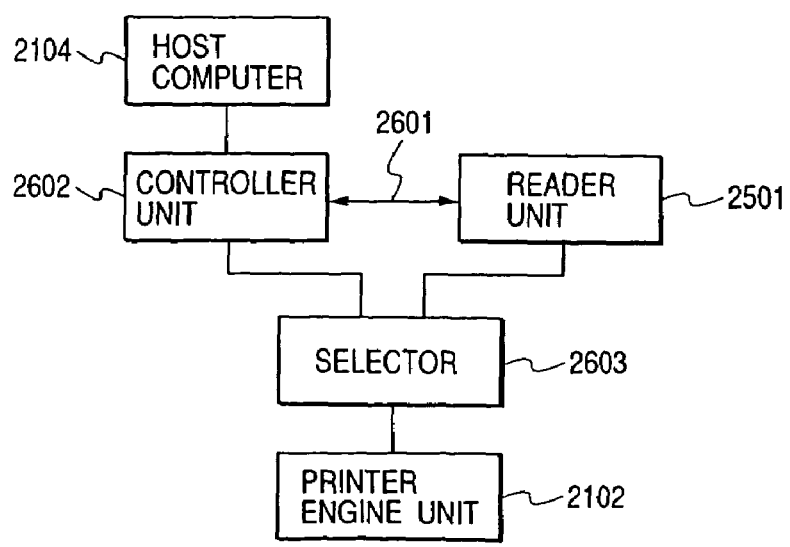

In the foregoing there has been explained the case of inhibiting the two-image formation mode according to the flow chart shown in FIG. 22, but it is also possible to inhibit the two-image formation mode according to a flow chart shown in FIG. 25.

FIG. 25 is a flow chart showing an example of the fourth data processing sequence in the image forming apparatus of the present embodiment, wherein numbers 51 to 56 indicate process steps.

At first there is discriminated whether the determined sheet size is a full size or a half or smaller size (51), and, if full size, the 1-page formation (retention) mode (1-image formation (retention) mode) is set because the 2-page formation (retention) mode cannot be executed (56) and the sequence is terminated. On the other hand, if the sheet size is discriminated as the half or smaller size, there is discriminated the number of copies (53), and, if the number of copies is identified as not plural but one, the 1-page formation mode is set because the 2-page formation mode cannot be executed (46) and the sequence is terminated. If the number of copies is identified as plural the 2-page formation mode is set (55) and the sequence is terminated.

On the other hand, if the step (52) identifies the black-and-white mode or monochromatic mode, there is discriminated whether the two-image formation (retention) inhibiting mode (1-image formation (retention) mode) is selected (54), and, if selected, the 1-image formation mode is set because the 2-image formation mode is possible in combination but is inhibited (46) and the sequence is terminated. If the 2-image formation inhibiting mode is not identified, there is set the 2-page formation mode (55) and the sequence is terminated.

The objects of the present invention can naturally be attained also in a case where a memory medium storing the program codes of a software realizing the aforementioned embodiments is supplied to a system or an apparatus and the functions of the aforementioned embodiments are realized by a computer (or CPU or MPU) of the above-mentioned system or apparatus by reading and executing the program codes stored in the memory medium.

In such case the program codes themselves realize the functions of the aforementioned embodiments, and the memory medium storing the program codes constitutes the present invention.

The memory medium storing such program codes can be, for example, a floppy disk, a hard disk, an optical disk, a magnetooptical disk, a CD-ROM, a CR-R, a magnetic tape, a non-volatile memory card, an ROM or an EEPROM.

The present invention also includes not only a case where the functions of the aforementioned embodiments are realized by the execution of the read program codes by the computer but also a case where an operating system or the like functioning on the computer executes all or a part of the actual processes under the control of such program codes thereby realizing the functions of the foregoing embodiments.

The present invention further includes a case wherein the program codes read from the memory medium are once stored in a memory provided in a function expansion board inserted into the computer or a function expansion unit connected thereto, and a CPU provided in the function expansion board or the function expansion unit executes all the process or a part thereof according to the instructions of such program codes, thereby realizing the functions of the aforementioned embodiments.

The present invention may also be applied to a system consisting of plural equipment or an apparatus consisting of a single equipment. The present invention is naturally applicable also to a case where the functions of the aforementioned embodiments are realized by the supply of a program to a system or an apparatus. In such case such system or apparatus can enjoy the effects of the aforementioned embodiments by reading a program of the software for realizing the aforementioned embodiments from a memory medium storing such program.

Also such system or apparatus can enjoy the effects of the aforementioned embodiments by downloading a program of the software for realizing the aforementioned embodiments from a data base on a network by a communication program.

As explained in the foregoing, the image forming apparatus of the present invention, provided with a reader unit for reading image information from originals fed in succession by an original feeding unit and adapted to execute image formation in a plural-image formation mode of forming images based on original image information of a predetermined number read in succession by the reader unit by an image forming unit on an image bearing member and transferring the original images formed on the image bearing member respectively onto recording media of the predetermined number fed in succession, comprises instruction means for manually inhibiting the execution of such plural-image formation mode, whereby the user can instruct the image formation by the ordinary image formation mode instead of the plural-image formation mode in case the image formation is interrupted or the formed image is distorted by the defective original feeding in the image formation in such plural-image formation mode.

Also as the instruction means is provided on the operation unit for the image forming apparatus, the user can use the operation unit of the image forming apparatus, the user can use the operation unit for instructing the image formation by the ordinary image formation mode instead of the plural-image formation mode.

Also as the plural-image formation mode is inhibited by the size of the recording medium, it is possible to inhibit such plural-image formation mode also in case the image formation is executed on the recording medium of a size which does not accept the image formation by the plural-image formation mode.

The image forming unit is capable of forming a color image by separating the color original image read by the reader unit into plural colors and transferring the original images of thus separated colors onto the recording medium, also is provided with setting means for setting a plural-color image forming mode or a mono-color image forming mode, and enables or disables the plural-image formation mode according to the size of the fed recording medium, set state of the setting means and the presence or absence of inhibition by the instruction means. Consequently the user can execute the mono-color image formation by the ordinary mono-color image formation mode instead of the plural-image formation mode in case the image formation is interrupted or the formed image is distorted by the defective original feeding in the image formation in such mono-color plural-image formation mode in the color image forming apparatus.

The plural-image formation mode mentioned above is a two-image formation mode of forming images based on the information of two original images read in succession by the reader unit on an image bearing member and transferring the two original images formed on the image bearing member respectively onto two recording media fed in succession. Thus the user can instruct the image formation by the ordinary image formation mode instead of the two-image formation mode in case the image formation is interrupted or the formed image is distorted by the defective original feeding in the image formation in such two-image formation mode.

Also even if the instruction means instructs inhibition, the plural-image formation mode is not inhibited in case of executing the image formation on the image data received from an external apparatus. Thus the image formation not requiring the exchange of the originals is executed automatically by the plural-image formation mode to improve the productivity.

Also even if the instruction means instructs inhibition, the plural-image formation mode is not inhibited in case of forming plural images for a single original. Thus the image formation in case the delay in the original exchange is not easily anticipated is executed automatically by the plural-image formation mode to improve the productivity.

Also in the present invention, the control method for the image forming apparatus, provided with a reader unit for reading image information from originals fed in succession by an original feeding unit and adapted to execute image formation in a plural-image formation mode of forming images based on original image information of a predetermined number read in succession by the reader unit by an image forming unit on an image bearing member and transferring the original images formed on the image bearing member respectively onto recording media of the predetermined number fed in succession, comprises an instruction step of manually inhibiting the execution of such plural-image formation mode, whereby the user can instruct the image formation by the ordinary image formation mode instead of the plural-image formation mode in case the image formation is interrupted or the formed image is distorted by the defective original feeding in the image formation in such plural-image formation mode.

Also as the instruction step is adapted to inhibit the execution of the plural-image formation mode from the operation unit of the image forming apparatus, the user can use the operation unit for instructing the image formation by the ordinary image formation mode instead of the plural-image formation mode.

Also as the plural-image formation mode is inhibited by the size of the recording medium, it is possible to inhibit such plural-image formation mode also in case the image formation is executed on the recording medium of a size which does not accept the image formation by the plural-image formation mode.

The image forming unit is capable of forming a color image by separating the color original image read by the reader unit into plural colors and transferring the original images of thus separated colors onto the recording medium, and there is provided a setting step of setting a plural-color image forming mode or a mono-color image forming mode, and the plural-image formation mode is enabled or disabled according to the size of the fed recording medium, set state of the setting means and the presence or absence of inhibition by the instruction means. Consequently the user can execute the mono-color image formation by the ordinary mono-color image formation mode instead of the plural-image formation mode in case the image formation is interrupted or the formed image is distorted by the defective original feeding in the image formation in such mono-color plural-image formation mode in the color image forming apparatus.

The plural-image formation mode mentioned above is a two-image formation mode of forming images based on the information of two original images read in succession by the reader unit on an image bearing member and transferring the two original images formed on the image bearing member respectively onto two recording media fed in succession. Thus the user can instruct the image formation by the ordinary image formation mode instead of the two-image formation mode in case the image formation is interrupted or the formed image is distorted by the defective original feeding in the image formation in such two-image formation mode.

Also even if the instruction step instructs inhibition, the plural-image formation mode is not inhibited in case of executing the image formation on the image data received from an external apparatus. Thus the image formation not requiring the exchange of the originals is executed automatically by the plural-image formation mode to improve the productivity.

Also even if the instruction step instructs inhibition, the plural-image formation mode is not inhibited in case of forming plural images for a single original. Thus the image formation in case the delay in the original exchange is not easily anticipated is executed automatically by the plural-image formation mode to improve the productivity.

Consequently image formation of high image quality can be achieved without trouble.

What is claimed is:

1. An image forming apparatus provided with a reader unit for reading image information from originals fed in succession by an original feeding unit and adapted to execute image formation in a plural-image retention forming mode of forming images based on original image information of a predetermined number, read by said reader unit, by an image forming unit on an image bearing member and transferring the original images formed on said image bearing member respectively onto recording media of the predetermined number fed in succession, said apparatus comprising:

instruction means for manually inhibiting the execution of said plural-image retention forming mode, wherein said image forming unit is adapted to form a color image by separating the color original image read by said reader unit into plural colors and transferring the original images of the separated colors respectively onto recording media;

said apparatus further comprises setting means for setting a plural-color image forming mode or a mono-color image forming mode; and said plural-image retention forming mode is enabled or disabled according to a size of the fed recording medium, set state of said setting means and presence or absence of inhibition by said instruction means.

2. An image forming apparatus provided with a reader unit for reading image information from originals fed in succession by an original feeding unit and adapted to execute image formation in a plural-image retention forming mode of forming images based on original image information of a predetermined number, read by said reader unit, by an image forming unit on an image bearing member and transferring the original images formed on said image bearing member respectively onto recording media of the predetermined number fed in succession, said apparatus comprising:

instruction means for manually inhibiting the execution of said plural-image retention forming mode, wherein said plural-image retention forming mode is a two-image retention forming mode of forming images based on information of two original images read in succession by said reader unit on an image bearing member and transferring the two original images formed on said image bearing member respectively onto two recording media fed in succession.

3. An image forming apparatus provided with a reader unit for reading image information from originals fed in succession by an original feeding unit and adapted to execute image formation in a plural-image retention forming mode of forming images based on original image information of a predetermined number, read by said reader unit, by an image forming unit on an image bearing member and transferring the original images formed on said image bearing member respectively onto recording media of the predetermined number fed in succession, said apparatus comprising:

instruction means for manually inhibiting the execution of said plural-image retention forming mode, wherein, even if said instruction means instructs inhibition, said plural-image retention forming mode is not inhibited when the image data received from an external apparatus is formed.

4. An image forming apparatus provided with a reader unit for reading image information from originals fed in succession by an original feeding unit and adapted to execute image formation in a plural-image retention forming mode of forming images based on original image information of a predetermined number, read by said reader unit, by an image forming unit on an image bearing member and transferring the original images formed on said image bearing member respectively onto recording media of the predetermined number fed in succession, said apparatus comprising:

instruction means for manually inhibiting the execution of said plural-image retention forming mode, wherein, even if said instruction means instructs inhibition, said plural-image retention forming mode is not inhibited when plural images are formed for a single original.

5. A control method for an image forming apparatus provided with a reader unit for reading image information from originals fed in succession by an original feeding unit and adapted to execute image formation in a plural-image retention forming mode of forming images based on original image information of a predetermined number, read by said reader unit, by an image forming unit on an image bearing member and transferring the original images formed on said image bearing member respectively onto recording media of the predetermined number fed in succession, said method comprising:

an instruction step of manually inhibiting the execution of said plural-image retention forming mode, wherein said image forming unit is adapted to form a color image by separating the color original image read by said reader unit into plural colors and transferring the original images of the separated colors respectively onto recording media;

said method further comprises a setting step of setting a plural-color image forming mode or a mono-color image forming mode; and said plural-image retention forming mode is enabled or disabled according to the size of the fed recording medium, set state of said setting means and the presence or absence of inhibition by said instruction means.

6. A control method for an image forming apparatus provided with a reader unit for reading image information from originals fed in succession by an original feeding unit and adapted to execute image formation in a plural-image retention forming mode of forming images based on original image information of a predetermined number, read by said reader unit, by an image forming unit on an image bearing member and transferring the original images formed on said image bearing member respectively onto recording media of the predetermined number fed in succession, said method comprising:

an instruction step of manually inhibiting the execution of said plural-image retention forming mode, wherein said plural-image retention forming mode is a two-image retention forming mode of forming images based on the information of two original images read in succession by said reader unit on an image bearing member and transferring the two original images formed on said image bearing member respectively onto two recording media fed in succession.

7. A control method for an image forming apparatus provided with a reader unit for reading image information from originals fed in succession by an original feeding unit and adapted to execute image formation in a plural-image retention forming mode of forming images based on original image information of a predetermined number, read by said reader unit, by an image forming unit on an image bearing member and transferring the original images formed on said image bearing member respectively onto recording media of the predetermined number fed in succession, said method comprising:

an instruction step of manually inhibiting the execution of said plural-image retention forming mode, wherein, even if said instruction step instructs inhibition, said plural-image retention forming mode is not inhibited in case of executing the image formation on the image data received from an external apparatus.

8. A control method for an image forming apparatus provided with a reader unit for reading image information from originals fed in succession by an original feeding unit and adapted to execute image formation in a plural-image retention forming mode of forming images based on original image information of a predetermined number, read by said reader unit, by an image forming unit on an image bearing member and transferring the original images formed on said image bearing member respectively onto recording media of the predetermined number fed in succession, said method comprising:

an instruction step of manually inhibiting the execution of said plural-image retention forming mode, wherein, even if said instruction step instructs inhibition, said plural-image retention forming mode is not inhibited when plural images are formed for a single original.

* * * * *

UNITED STATES PATENT AND TRADEMARK OFFICE
CERTIFICATE OF CORRECTION

PATENT NO. : 7,006,239 B1 Page 1 of 1
APPLICATION NO. : 09/352201
DATED : February 28, 2006
INVENTOR(S) : Hideto Kohtani et al.

It is certified that error appears in the above-identified patent and that said Letters Patent is hereby corrected as shown below:

COLUMN 9:
Line 20, "executes" should read --execute--.

COLUMN 17:
Line 15, "there" should read --it--.
Line 21, "there" should read --it--.

Signed and Sealed this

Fifteenth Day of August, 2006

JON W. DUDAS
*Director of the United States Patent and Trademark Office*